United States Patent
Boon et al.

(10) Patent No.: US 12,269,311 B2
(45) Date of Patent: Apr. 8, 2025

(54) DUAL TUBE LOAD DISTRIBUTION UNIT FOR VEHICLE SUSPENSION SYSTEM

(71) Applicant: DRiV Automotive Inc., Northville, MI (US)

(72) Inventors: Peter Boon, Merchtem (BE); Tom Daniels, Testelt (BE); Paolo Diomedi, Brussels (BE)

(73) Assignee: DRiV Automotive Inc., Northville, MI (US)

( * ) Notice: Subject to any disclaimer, the term of this patent is extended or adjusted under 35 U.S.C. 154(b) by 0 days.

(21) Appl. No.: 18/302,318

(22) Filed: Apr. 18, 2023

(65) Prior Publication Data
US 2024/0351391 A1 Oct. 24, 2024

(51) Int. Cl.
*B60G 17/08* (2006.01)
*B60G 13/08* (2006.01)
*B60G 21/06* (2006.01)

(52) U.S. Cl.
CPC ............ *B60G 17/08* (2013.01); *B60G 13/08* (2013.01); *B60G 21/06* (2013.01); *B60G 2202/24* (2013.01); *B60G 2202/415* (2013.01); *B60G 2500/10* (2013.01)

(58) Field of Classification Search
CPC .................................. B60G 17/08; B60G 21/06
See application file for complete search history.

(56) References Cited

U.S. PATENT DOCUMENTS

| | | | | |
|---|---|---|---|---|
| 5,447,332 A | * | 9/1995 | Heyring | B60G 21/06 280/124.161 |
| 5,601,307 A | * | 2/1997 | Heyring | B60G 21/06 701/37 |
| 6,213,485 B1 | * | 4/2001 | Doll | B60G 17/0408 280/124.16 |
| 6,270,098 B1 | * | 8/2001 | Heyring | B60G 17/033 280/6.155 |
| 7,611,152 B2 | | 11/2009 | van der Knaap | |

(Continued)

FOREIGN PATENT DOCUMENTS

| | | | | |
|---|---|---|---|---|
| CN | 1771141 A | * | 5/2006 | ............ B60G 21/06 |
| FR | 2907377 A1 | | 4/2008 | |

(Continued)

*Primary Examiner* — Paul N Dickson
*Assistant Examiner* — Tiffany L Webb
(74) *Attorney, Agent, or Firm* — Harness, Dickey & Pierce, P.L.C.

(57) ABSTRACT

A suspension system including hydraulic circuits that extend between dampers located at opposite corners of the vehicle and at least one load distribution unit that is connected in fluid communication with at least two hydraulic circuits. The load distribution unit includes a manifold block with a cylinder bore, a pair of pressure tubes, a piston rod assembly, and a pair of reserve tubes. The pressure tubes are partially received in the cylinder bore to define a pair of opposed cylinders. The piston rod assembly includes a piston rod and a pair of opposed pistons that are slidingly received within the opposed cylinders. The reserve tubes are at least partially received in the cylinder bore and are arranged annularly about the pressure tubes to define a first pair of reservoir chambers between the pressure tubes and the reserve tubes.

20 Claims, 11 Drawing Sheets

(56) References Cited

U.S. PATENT DOCUMENTS

| | | |
|---|---|---|
| 8,123,235 B2 | 2/2012 | Monk et al. |
| 8,544,863 B2 | 10/2013 | Revill et al. |
| 11,590,819 B2 * | 2/2023 | Letizio ............... B60G 17/0523 |
| 11,691,474 B2 | 7/2023 | Boon et al. |
| 11,697,319 B2 | 7/2023 | Vandersmissen et al. |
| 11,865,887 B2 | 1/2024 | Boon et al. |
| 11,865,889 B2 | 1/2024 | Vandersmissen et al. |
| 11,912,092 B2 | 2/2024 | Vandersmissen et al. |
| 11,919,355 B2 | 3/2024 | Calchand et al. |
| 11,938,772 B2 | 3/2024 | Vandersmissen et al. |
| 12,059,937 B2 * | 8/2024 | Boon ................... B60G 21/103 |
| 12,083,848 B1 * | 9/2024 | Dhaens .............. B60G 17/0162 |
| 12,083,851 B1 * | 9/2024 | Dhaens .............. B60G 17/0162 |
| 12,097,739 B2 | 9/2024 | Calchand et al. |
| 2005/0001401 A1 * | 1/2005 | Heyring ................. B60G 21/10 280/124.157 |
| 2005/0133978 A1 * | 6/2005 | Lemmens ............. B60G 17/08 267/140.15 |
| 2005/0225050 A1 | 10/2005 | Mizuno |
| 2006/0151969 A1 * | 7/2006 | Revill ................. B60G 17/056 280/124.162 |
| 2007/0138756 A1 | 6/2007 | Fontdecaba Buj |
| 2007/0170680 A1 | 7/2007 | Knaap |
| 2008/0272561 A1 * | 11/2008 | Monk ................... B60G 21/06 280/124.16 |
| 2013/0319804 A1 | 12/2013 | Six et al. |
| 2017/0240019 A1 | 8/2017 | Six et al. |
| 2020/0324603 A1 * | 10/2020 | Ohno ................... B60G 17/018 |
| 2021/0003190 A1 * | 1/2021 | Deferme ............... B60G 17/08 |
| 2023/0109741 A1 * | 4/2023 | Vandersmissen .... B60G 21/067 280/124.161 |
| 2023/0111759 A1 * | 4/2023 | Vandersmissen .... B60G 17/056 280/5.514 |
| 2023/0111977 A1 | 4/2023 | Boon et al. |
| 2023/0113777 A1 * | 4/2023 | Vandersmissen .... B60G 21/073 701/37 |
| 2023/0114717 A1 * | 4/2023 | Boon ................... B60G 21/073 701/37 |
| 2024/0317007 A1 * | 9/2024 | Henderickx ......... B60G 17/016 |

FOREIGN PATENT DOCUMENTS

| | | | |
|---|---|---|---|
| JP | 2005351380 A | 12/2005 | |
| JP | 4674882 B2 * | 4/2011 | ............. B60G 21/06 |
| KR | 20110094937 A * | 8/2011 | |

* cited by examiner

DUAL TUBE LOAD DISTRIBUTION UNIT FOR VEHICLE SUSPENSION SYSTEM

FIELD

The present disclosure relates generally to vehicle suspension systems and more particularly to load distribution manifold assemblies that are used to control roll and/or pitch movements of a vehicle by controlling fluid flow and pressure within an adaptive suspension system.

BACKGROUND

The statements in this section merely provide background information related to the present disclosure and may not constitute prior art.

Suspension systems improve the ride of a vehicle by absorbing bumps and vibrations that would otherwise unsettle the vehicle body. Suspension systems also improve safety and control by improving contact between the ground and the tires of the vehicle. One drawback of suspension systems is that basic spring/damper arrangements will allow the vehicle to roll/lean right or left during corning (e.g., in turns), pitch forward under deceleration (e.g., under braking), and pitch back under acceleration. The lateral acceleration the vehicle experiences in turns causes a roll moment where the vehicle will lean/squat to the right when turning left and to the left when turning right. The fore and aft acceleration the vehicle experiences under acceleration and braking causes a pitch moment where the vehicle will lean forward loading the front axle during braking and aft, loading the rear axle, under acceleration. These roll and pitch moments decrease grip, cornering performance, and braking performance and can also be uncomfortable to the driver and passengers. Many vehicles are equipped with stabilizer bars/anti-roll bars, which are mechanical systems that help counteract the roll moments experienced during driving. For example, anti-roll bars are typically mechanical linkages that extend laterally across the width of the vehicle between the right and left dampers. When one of the dampers extends, the anti-roll bar applies a force to the opposite damper that counteracts the roll moment of the vehicle and helps to correct the roll angle to provide flatter cornering. However, there are several drawbacks associated with these mechanical systems. First, there are often packaging constraints associated with mechanical systems because a stabilizer bar/anti-roll bar requires a relatively straight, unobstructed path across the vehicle between the dampers. Second, stabilizer bars/anti-roll bars are reactive and work when the suspension starts moving (i.e., leaning). Such mechanical systems cannot be easily switched off or cancelled out when roll stiffness is not need. Some vehicles do have stabilizer bar/anti-roll bar disconnects that may be manually or electronically actuated, but the complexity and cost associated with these systems make them ill-suited for most vehicle applications.

In an effort to augment or replace traditional mechanical stabilizer bars/anti-roll bars, anti-roll suspension systems are being developed that hydraulically connect two or more dampers in a hydraulic circuit where the extension of one damper produces a pressure change in the other damper(s) in the hydraulic circuit that makes it more difficult to compress the other damper(s) in the hydraulic circuit. This pressure change in the other damper(s) increases the roll stiffness of the suspension system of the vehicle. However, the downside of such systems is that ride comfort is more difficult to achieve because bump forces can be transmitted from one damper to another damper across the hydraulic circuit resulting in unwanted suspension movement. Accordingly, there remains a need for improved vehicle suspension systems that can minimize roll while maintaining acceptable levels of ride comfort.

The present disclosure is directed to load distribution units, which are manifold assemblies that are connected to the hydraulic lines that run between the multiple dampers in the suspension system. The load distribution unit includes multiple electro-mechanical valves and accumulators that are used/actuated to control fluid flow and pressure within the hydraulic lines of the suspension system to selectively and dynamically provide resistance to roll and/or pitch movements of the vehicle.

SUMMARY

This section provides a general summary of the disclosure and is not a comprehensive disclosure of its full scope or all of its features.

In accordance with one aspect of the subject disclosure, a suspension system is provided that includes four dampers: a front left damper, a front right damper, a back left damper, and a back right damper. The front left damper includes a first compression chamber and a first rebound chamber. The front right damper includes a second compression chamber and a second rebound chamber. The back left damper includes a third compression chamber and a third rebound chamber. The back right damper includes a fourth compression chamber and a fourth rebound chamber. The suspension system of the present disclosure also includes four hydraulic circuits, which are described herein as a first hydraulic circuit, a second hydraulic circuit, a third hydraulic circuit, and a fourth hydraulic circuit.

The first hydraulic circuit extends between and fluidly connects the first compression chamber of the front left damper and the fourth rebound chamber of the back right damper. The second hydraulic circuit extends between and fluidly connects the second compression chamber of the front right damper and the third rebound chamber of the back left damper. The third hydraulic circuit extends between and fluidly connects the first rebound chamber of the front left damper and the fourth compression chamber of the back right damper. Finally, the fourth hydraulic circuit extends between and fluidly connects the second rebound chamber of the front right damper and the third compression chamber of the back left damper. Thus, it should be appreciated that the first and third hydraulic circuits include hydraulic lines that physically cross over hydraulic lines of the second and fourth hydraulic circuits and/or include hydraulic conduits within a manifold block that cross over one another.

The suspension system also includes at least one load distribution unit that is arranged in fluid communication with at least two out of the four hydraulic circuits described above. For example, the suspension system may include one load distribution unit that is arranged in fluid communication with all four hydraulic circuits. Alternatively, the suspension system could include a pair of split load distribution units where a first split load distribution unit is arranged in fluid communication with two of the hydraulic circuits and a second split load distribution unit is arranged in fluid communication with the other two hydraulic circuits.

Regardless of the configuration, the load distribution unit includes a manifold block with a first cylinder bore, a first pair of pressure tubes, a first piston rod assembly, and a first pair of reserve tubes. The first pair of pressure tubes are at least partially received in the first cylinder bore on opposing sides of the manifold block to define a first pair of opposed cylinders. The first piston rod assembly includes a first piston rod and a first pair of opposed pistons that are mounted on the first piston rod. The first pair of opposed pistons are slidingly received within the first pair of opposed cylinders. The first pair of reserve tubes are at least partially received in the first cylinder bore on opposing sides of the manifold block and are arranged annularly about the first pair of pressure tubes to define a first pair of reservoir chambers between the first pair of pressure tubes and the first pair of reserve tubes.

In accordance with another aspect of the present disclosure, where the load distribution unit is configured to be connected in fluid communication with all four hydraulic circuits of the suspension system described above, the load distribution unit includes a first pair of opposed cylinders and a second pair of opposed cylinders. More specifically, the load distribution unit includes a manifold block with first and second cylinder bores, which may extend through the manifold block in a parallel and spaced apart relationship. A first pair of pressure tubes are at least partially received in the first cylinder bore on opposing sides of the manifold block to define the first pair of opposed cylinders. A second pair of pressure tubes are at least partially received in the second cylinder bore on opposing sides of the manifold block to define a second pair of opposed cylinders. The load distribution unit includes a first piston rod assembly with a first piston rod and a first pair of opposed pistons that are mounted on the first piston rod. The first pair of opposed pistons are slidingly received within the first pair of opposed cylinders. The load distribution unit also includes a second piston rod assembly with a second piston rod and a second pair of opposed pistons that are mounted on the second piston rod. The second pair of opposed pistons are slidingly received within the second pair of opposed cylinders. A first pair of reserve tubes are at least partially received in the first cylinder bore on opposing sides of the manifold block and are arranged annularly about the first pair of pressure tubes. As such, a first pair of reservoir chambers are defined between the first pair of pressure tubes and the first pair of reserve tubes. A second pair of reserve tubes are at least partially received in the second cylinder bore on opposing sides of the manifold block and are arranged annularly about the second pair of pressure tubes. As a result, a second pair of reservoir chambers are defined between the second pair of pressure tubes and the second pair of reserve tubes.

In accordance with another aspect of the present disclosure, a suspension control system is provided with one load distribution unit or two split load distribution units. In accordance with this aspect of the present disclosure, the suspension control system includes a first split load distribution unit that is configured to be arranged in fluid communication with one or more dampers through connections to two hydraulic circuits (e.g., the second and third hydraulic circuits described above). The first split load distribution unit includes a first manifold block with a first cylinder bore, a first pair of pressure tubes, a first piston rod assembly, and a first pair of reserve tubes. The first pair of pressure tubes are at least partially received in the first cylinder bore on opposing sides of the first manifold block to define a first pair of opposed cylinders. The first piston rod assembly includes a first piston rod and a first pair of opposed pistons that are mounted on the first piston rod. The first pair of opposed pistons are slidingly received within the first pair of opposed cylinders. The first pair of reserve tubes are at least partially received in the first cylinder bore on opposing sides of the first manifold block and are arranged annularly about the first pair of pressure tubes to define a first pair of reservoir chambers between the first pair of pressure tubes and the first pair of reserve tubes.

In accordance a further aspect of the present disclosure, the suspension control system includes a second split load distribution unit that is configured to be arranged in fluid communication with one or more dampers through connections to two other hydraulic circuits (e.g., the first and fourth hydraulic circuits described above). The second split load distribution unit includes a second manifold block with a second cylinder bore, a second pair of pressure tubes, a second piston rod assembly, and a second pair of reserve tubes. The second pair of pressure tubes are at least partially received in the second cylinder bore on opposing sides of the second manifold block to define a second pair of opposed cylinders. The second piston rod assembly includes a second piston rod and a second pair of opposed pistons that are mounted on the second piston rod. The second pair of opposed pistons are slidingly received within the second pair of opposed cylinders. The second pair of reserve tubes are at least partially received in the second cylinder bore on opposing sides of the second manifold block and are arranged annularly about the second pair of pressure tubes. As a result, a second pair of reservoir chambers are defined between the second pair of pressure tubes and the second pair of reserve tubes.

In accordance a further aspect of the present disclosure, the first and second split load distribution units may be positioned in an end-to-end arrangement where the first piston rod and the second piston rod are aligned with one another along a common axis.

Advantageously, the load distribution units described above are configured to regulate hydraulic pressure within the hydraulic circuits and are therefore able to reduce/eliminate vehicle roll while cornering and vehicle pitch during acceleration and braking for improved grip, performance, handling, and braking. The reduction of roll and pitch angles improves the comfort, steering feel, agility, and stability of the vehicle. Roll and pitch control is provided by increasing the roll and pitch stiffness of the suspension system (based on static pressure in the system). The level of roll and pitch stiffness can be adjusted by changing the static pressure in select hydraulic circuits of the suspension system. Comfort is also improved because the anti-roll and anti-pitch forces applied by the load distribution unit are independent of the damping forces.

It should be appreciated that in the load distribution units described above, the first pair of opposed cylinders and/or the second pair of opposed cylinders are constructed in a tube-within-a-tube arrangement. This is particularly advantageous because it reduces the number of internal passageways and/or external hydraulic lines that must be machined into or connected with the manifold block. In particular, the first and/or second pair of reservoir chambers allow hydraulic fluid (e.g., oil) to return back to the manifold block. As a result, the tube-within-a-tube arrangement of the first pair of opposed cylinders and/or the second pair of opposed cylinders provides a better and more economical way of constructing the load distribution unit.

BRIEF DESCRIPTION OF THE DRAWINGS

Other advantages of the present disclosure will be readily appreciated, as the same becomes better understood by reference to the following detailed description when considered in connection with the accompanying drawings wherein.

DETAILED DESCRIPTION

Figure 1:
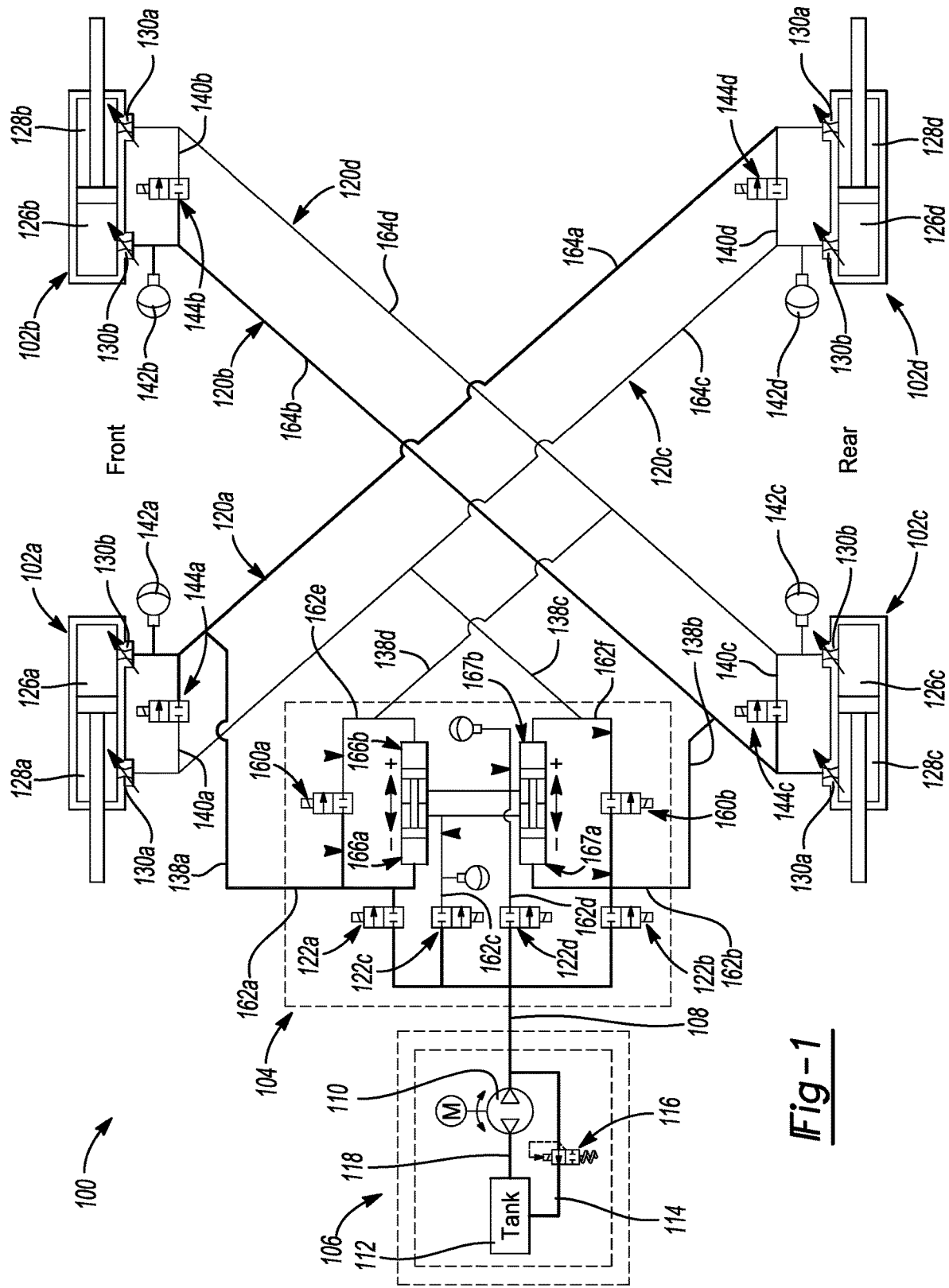
FIG. 1 is a schematic diagram illustrating an exemplary suspension system of the present disclosure that includes four hydraulic circuits connecting the front and rear dampers and an exemplary load distribution unit.

Referring to the Figures, wherein like numerals indicate corresponding parts throughout the several views, various suspension control systems are shown.

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIG. 1, a suspension system 100 for a vehicle is illustrated with a front left damper 102a, a front right damper 102b, a back left damper 102c, and a back right damper 102d. While it should be appreciated that the suspension system 100 described herein may include a different number of dampers than those shown in the drawings, in most automotive applications, four dampers are used at each corner of the vehicle to control vertical movements of the front and rear wheels of the vehicle. Thus, the front left damper 102a controls (e.g., dampens) up and down (i.e., vertical) movements of the front left wheel of the vehicle, the front right damper 102b controls (e.g., dampens) up and down (i.e., vertical) movements of the front right wheel of the vehicle, the back left damper 102c controls (e.g., dampens) up and down (i.e., vertical) movements of the back left wheel of the vehicle, and the back right damper 102d controls (e.g., dampens) up and down (i.e., vertical) movements of the back right wheel of the vehicle.

Each of the dampers 102a, 102b, 102c, 102d of the suspension system 100 includes a damper housing, a piston rod, and a piston that is mounted on the piston rod. The piston is arranged in sliding engagement with the inside of the damper housing such that the piston divides the damper housing into compression and rebound chambers. As such, the front left damper 102a includes a first compression chamber 126a and a first rebound chamber 128a, the front right damper 102b includes a second compression chamber 126b and a second rebound chamber 128b, the back left damper 102c includes a third compression chamber 126c and a third rebound chamber 128c, and the back right damper 102d includes a fourth compression chamber 126d and a fourth rebound chamber 128d.

In each damper 102a, 102b, 102c, 102d, the piston is a closed piston with no fluid flow paths defined within or by its structure. The rebound chambers 128a, 128b, 128c, 128d of the dampers 102a, 102b, 102c, 102d decrease in volume during rebound/extension strokes and increase in volume during compression strokes of the dampers 102a, 102b, 102c, 102d. The compression chambers 126a, 126b, 126c, 126d of the dampers 102a, 102b, 102c, 102d decrease in volume during compression strokes of the dampers 102a, 102b, 102c, 102d and increase in volume during rebound/extension strokes of the dampers 102a, 102b, 102c, 102d.

Each damper 102a, 102b, 102c, 102d also includes rebound and compression chamber ports 130a, 130b in the damper housing that are each provided with dampening valves. The rebound chamber port 130a is arranged in fluid communication with the rebound chamber 128a, 128b, 128c, 128d of the damper 102a, 102b, 102c, 102d and the second port 130b is arranged in fluid communication with the compression chamber 126a, 126b, 126c, 126d of the damper 102a, 102b, 102c, 102d. The dampening valves in the rebound and compression chamber ports 130a, 130b can be passive/spring-biased valves (e.g., spring-disc stacks) or active valves (e.g., electromechanical valves) and control fluid flow into and out of the compression and rebound chambers of the dampers 102a, 102b, 102c, 102d to provide one or more rebound dampening rates and compression dampening rates for each of the dampers 102a, 102b, 102c, 102d.

The suspension system 100 also includes a load distribution unit 104 that is connected in fluid communication with a pump assembly 106 by a pump hydraulic line 108. The pump assembly 106 includes a bi-directional pump 110, a hydraulic reservoir 112 (e.g., a tank), and a bypass hydraulic line 114 that can be open and closed by a pressure relief valve 116. The load distribution unit 104 is connected in fluid communication with the front and rear dampers 102a, 102b, 102c, 102d by four hydraulic circuits 120a, 120b, 120c, 120d: a first hydraulic circuit 120a, a second hydraulic circuit 120b, a third hydraulic circuit 120c, and a fourth hydraulic circuit 120d.

The load distribution unit 104 is constructed and operates as a manifold assembly that controls/regulates fluid flow and pressure within the four hydraulic circuits 120a, 120b, 120c, 120d. The load distribution unit 104 includes four seat valves 122a, 122b, 122c, 122d (a first seat valve 122a, a second seat valve 122b, a third seat valve 122c, and a fourth seat valve 122d) that are connected in parallel with the pump hydraulic line 108. The load distribution unit 104 further includes a first comfort valve 160a, a second comfort valve 160b, and six manifold passageways 162a, 162b, 162c, 162d, 162e, 162f: a first manifold passageway 162a, a second manifold passageway 162b, a third manifold passageway 162c, a fourth manifold passageway 162d, a fifth manifold passageway 162e, and a sixth manifold passageway 162f. The first manifold passageway 162a is connected in fluid communication with the first seat valve 122a and the first comfort valve 160a while the second manifold passageway 162b is connected in fluid communication with the second seat valve 122b and the second comfort valve 160b. The third manifold passageway 162c is connected in fluid communication with the third seat valve 122c and the fourth manifold passageway 162d is connected in fluid communication with the fourth seat valve 122d. The fifth manifold passageway 162e is connected in fluid communication with the first comfort valve 160a and the sixth manifold passageway 162f is connected in fluid communication with the second comfort valve 160b. Additional structure and operational details of the load distribution unit 104 is described below in connection with FIG. 2; however, it should be appreciated from FIG. 1 that the load distribution unit 104 regulates/controls fluid pressure in the four hydraulic circuits 120a, 120b, 120c, 120d, which dynamically adjusts the roll and pitch stiffness of the vehicle and can be used to either augment or completely replace mechanical stabilizer bars/anti-roll bars. Such mechanical systems require relatively straight, unobstructed runs between each of the front dampers 102a, 102b and each of the back dampers 102c, 102d. Accordingly, the suspension system 100 disclosed herein offers packaging benefits because the dampers 102a, 102b, 102c, 102d only need to be hydraulically connected to the load distribution unit 104.

The first hydraulic circuit 120a includes a first cross-over hydraulic line 164a that extends between and fluidly connects the compression chamber port 130b (to the first compression chamber 126a) of the front left damper 102a and the rebound chamber port 130a (to the fourth rebound chamber 128d) of the back right damper 102d. The first hydraulic circuit 120a also includes a first manifold hydraulic line 138a that extends between and fluidly connects the first cross-over hydraulic line 164a and the first manifold passageway 162a. The second hydraulic circuit 120b includes a second cross-over hydraulic line 164b that extends between and fluidly connects the compression chamber port 130b (to the second compression chamber 126b) of the front right damper 102b and the rebound chamber port 130a (to the third rebound chamber 128c) of the back left damper 102c. The second hydraulic circuit 120b also includes a second manifold hydraulic line 138b that extends between and fluidly connects the second cross-over hydraulic line 164b and the second manifold passageway 162b. The third hydraulic circuit 120c includes a third cross-over hydraulic line 164c that extends between and fluidly connects the rebound chamber port 130a (to the first rebound chamber 128a) of the front left damper 102a and the compression chamber port 130b (to the fourth compression chamber 126d) of the back right damper 102d. The third hydraulic circuit 120c also includes a third manifold hydraulic line 138c that extends between and fluidly connects the third cross-over hydraulic line 164c and the sixth manifold passageway 162f. The fourth hydraulic circuit 120d includes a fourth cross-over hydraulic line 164d that extends between and fluidly connects the rebound chamber port 130a (to the second rebound chamber 128b) of the front right damper 102b and the compression chamber port 130b (to the third compression chamber 126c) of the back left damper 102c. The fourth hydraulic circuit 120d also includes a fourth manifold hydraulic line 138d that extends between and fluidly connects the fourth cross-over hydraulic line 164d and the fifth manifold passageway 162e. It should be appreciated that the word "cross-over" as used in the first, second, third, and fourth cross-over hydraulic lines 164a, 164b, 164c, 164d simply means that the first, second, third, and fourth cross-over hydraulic lines 164a, 164b, 164c, 164d run between dampers 102a, 102b, 102c, 102d at opposite corners of the vehicle (e.g., front left to back right and front right to back left). The first, second, third, and fourth cross-over hydraulic lines 164a, 164b, 164c, 164d need not be linear or arranged in any particular direction as long as they ultimately connect dampers 102a, 102b, 102c, 102d positioned at opposite corners of the vehicle.

The suspension system 100 also includes four bridge hydraulic lines 140a, 140b, 140c, 140d that fluidly couple the first and third hydraulic circuits 120a, 120c and the second and fourth hydraulic circuits 120b, 120d to one another. The four bridge hydraulic lines 140a, 140b, 140c, 140d include a front left bridge hydraulic line 140a that extends between and fluidly connects the first cross-over hydraulic line 164a and the third cross-over hydraulic line 164c, a front right bridge hydraulic line 140b that extends between and fluidly connects the second cross-over hydraulic line 164b and the fourth cross-over hydraulic line 164d, a back left bridge hydraulic line 140c that extends between and fluidly connects the second cross-over hydraulic line 164b and the fourth cross-over hydraulic line 164d, and a back right bridge hydraulic line 140d that extends between and fluidly connects the first cross-over hydraulic line 164a and the third cross-over hydraulic line 164c.

The front left bridge hydraulic line 140a is connected to the first cross-over hydraulic line 164a between the compression chamber port 130b of the front left damper 102a and the first manifold hydraulic line 138a and is connected to the third cross-over hydraulic line 164c between the rebound chamber port 130a of the front left damper 102a and the third manifold hydraulic line 138c. The front right bridge hydraulic line 140b is connected to the second cross-over hydraulic line 164b between the compression chamber port 130b of the front right damper 102b and the second manifold hydraulic line 138b and is connected to the fourth cross-over hydraulic line 164d between the rebound chamber port 130a of the front right damper 102b and the fourth manifold hydraulic line 138d. The back left bridge hydraulic line 140c is connected to the second cross-over hydraulic line 164b between the rebound chamber port 130a of the back left damper 102c and the second manifold hydraulic line 138b and is connected to the fourth cross-over hydraulic line 164d between the compression chamber port 130b of the back left damper 102c and the fourth manifold hydraulic line 138d. The back right bridge hydraulic line 140d is connected to the first cross-over hydraulic line 164a between the rebound chamber port 130a of the back right damper 102d and the first manifold hydraulic line 138a and is connected to the third cross-over hydraulic line 164c between the compression chamber port 130b of the back right damper 102d and the third manifold hydraulic line 138c.

A front left accumulator 142a is arranged in fluid communication with the first cross-over hydraulic line 164a at a location between the compression chamber port 130b of the front left damper 102a and the front left bridge hydraulic line 140a. A front right accumulator 142b is arranged in fluid communication with the second cross-over hydraulic line 164b at a location between the compression chamber port 130b of the front right damper 102b and the front right bridge hydraulic line 140b. A back left accumulator 142c is arranged in fluid communication with the fourth cross-over hydraulic line 164d at a location between the compression chamber port 130b of the back left damper 102c and the back left bridge hydraulic circuit 120c. A back right accumulator 142d is arranged in fluid communication with the third cross-over hydraulic line 164c at a location between the compression chamber port 130b of the back right damper 102d and the back right bridge hydraulic line 140d. Each of the accumulators 142a, 142b, 142c, 142d have a variable fluid volume that increases and decreases depending on the fluid pressure in the cross-over hydraulic lines 164a, 164b, 164c, 164d. It should be appreciated that the accumulators 142a, 142b, 142c, 142d may be constructed in a number of different ways. For example and without limitation, the accumulators 142a, 142b, 142c, 142d may have accumulation chambers and pressurized gas chambers that are separated by floating pistons, flexible membranes, or bellows.

The suspension system 100 also includes four electro-mechanical comfort valves 144a, 144b, 144c, 144d that are connected in-line (i.e., in series) with each of the bridge hydraulic lines 140a, 140b, 140c, 140d. A front left comfort valve 144a is positioned in the front left bridge hydraulic line 140a. A front right comfort valve 144b is positioned in the front right bridge hydraulic line 140b. A back left comfort valve 144c is positioned in the back left bridge hydraulic line 140c. A back right comfort valve 144d is positioned in the back right bridge hydraulic line 140d. In the illustrated example, the four comfort valves 144a, 144b, 144c, 144d adjacent to the dampers 102a, 102b, 102c, 102d and the two comfort valves 160a, 160b located on the load distribution unit 104 are semi-active electro-mechanical valves with a combination of passive spring-disk elements and a solenoid. The four comfort valves 144a, 144b, 144c, 144d adjacent to the dampers 102a, 102b, 102c, 102d and the two comfort valves 160a, 160b located on the load distribution unit 104 are electronically connected to the controller, which is configured to supply electrical current to the solenoids of the four comfort valves 144a, 144b, 144c, 144d adjacent to the dampers 102a, 102b, 102c, 102d and the two comfort valves 160a, 160b located on the load distribution unit 104 to selectively and individually open and close the four comfort valves 144a, 144b, 144c, 144d adjacent to the dampers 102a, 102b, 102c, 102d and the two comfort valves 160a, 160b located on the load distribution unit 104.

When the seat valves 122a, 122b, 122c, 122d are closed, the hydraulic circuits 120a, 120b, 120c, 120d operate as a closed loop system, either together or separately depending on the open or closed status of the four comfort valves 144a, 144b, 144c, 144d adjacent to the dampers 102a, 102b, 102c, 102d and the two comfort valves 160a, 160b located on the load distribution unit 104. When the seat valves 122a, 122b, 122c, 122d are open, the bi-directional pump 110 either adds or removes fluid from one or more of the hydraulic circuits 120a, 120b, 120c, 120d. There are three primary types of suspension movements that the illustrated suspension system 100 can control either passively (i.e., as a closed loop system) or actively (i.e., as an open loop system) by changing or adapting the roll and/or pitch stiffness of the vehicle: leaning to one side or the other during cornering (i.e., roll) pitching forward during braking (i.e., brake dive), and pitching aft during acceleration (i.e., rear end squat). Descriptions of how the suspension system 100 reacts to each of these conditions are provided below.

When the vehicle is put into a right-hand turn, the momentum of the sprung weight of the vehicle tends to make the vehicle lean left towards the outside of the turn, compressing the front left damper 102a and the back left damper 102c. When this occurs, fluid flows out from the first compression chamber 126a of the front left damper 102a and the third compression chamber 126c of the back left damper 102c into the first and fourth cross-over hydraulic lines 164a, 164d. As a result of the weight transfer to the left side of the vehicle, the front right damper 102b and back right damper 102d begin to extend, causing fluid to flow out of the second rebound chamber 128b of the front right damper 102b and the fourth rebound chamber 128d of the back right damper 102d into the first and fourth cross-over hydraulic lines 164a, 164d. When the four comfort valves 144a, 144b, 144c, 144d adjacent to the dampers 102a, 102b, 102c, 102d are closed, the fluid flow out of the first compression chamber 126a of the front left damper 102a, out of the third compression chamber 126c of the back left damper 102c, out of the second rebound chamber 128b of the front right damper 102b, and out of the fourth rebound chamber 128d of the back right damper 102d and into the first and fourth cross-over hydraulic lines 164a, 164d increases the pressure in the front left and back left accumulators 142a, 142c, thus providing a passive roll resistance where it becomes increasingly more difficult to compress the front left damper 102a and the back left damper 102c since the first compression chamber 126a of the front left damper 102a and the third compression chamber 126c of the back left damper 102c are connected in fluid communication with the first and fourth hydraulic circuits 120a, 120d. At the same time, fluid flows out of front right and back right accumulators 142b, 142d and into the first rebound chamber 128a of the front left damper 102a, into the third rebound chamber 128c of the back left damper 102c, into the second compression chamber 126b of the front right damper 102b, and into the fourth compression chamber 126d of the back right damper 102d. The resulting pressure difference between the dampers 102a, 102b, 102c, 102d generates damper forces that counteract or resist the roll moment of the vehicle. Additional roll resistance can be added by opening the first seat valve 122a and the first comfort valve 160a as the bi-directional pump 110 is running in a first direction where the bi-directional pump 110 draws in hydraulic fluid from the reservoir hydraulic line 118 and discharges hydraulic fluid into the pump hydraulic line 108 to produce a positive pressure in the pump hydraulic line 108, which increases fluid pressure in the first and fourth hydraulic circuits 120a, 120d.

The opposite is true when the vehicle is put into a left-hand turn, where the momentum of the sprung weight of the vehicle tends to make the vehicle lean right towards the outside of the turn, compressing the front right damper 102b and the back right damper 102d. When this occurs, fluid flows out from the second compression chamber 126b of the front right damper 102b and the fourth compression chamber 126d of the back right damper 102d into the second and third cross-over hydraulic lines 164b, 164c. As a result of the weight transfer to the right side of the vehicle, the front left damper 102a and back left damper 102c begin to extend, causing fluid to flow out of the first rebound chamber 128a of the front left damper 102a and the third rebound chamber 128c of the back left damper 102c into the second and third cross-over hydraulic lines 164b, 164c. When the four comfort valves 144a, 144b, 144c, 144d adjacent to the dampers 102a, 102b, 102c, 102d are closed, the fluid flow out of the second compression chamber 126b of the front right damper 102b, out of the fourth compression chamber 126d of the back right damper 102d, out of the first rebound chamber 128a of the front left damper 102a, and out of the third rebound chamber 128c of the back left damper 102c and into the second and third cross-over hydraulic lines 164b, 164c increases the pressure in the front right and back right accumulators 142b, 142d, thus providing a passive roll resistance where it becomes increasingly more difficult to compress the front right damper 102b and the back right damper 102d since the second compression chamber 126b of the front right damper 102b and the fourth compression chamber 126d of the back right damper 102d are connected in fluid communication with the second and third hydraulic circuits 120b, 120c. At the same time, fluid flows out of front left and back left accumulators 142a, 142c and into the second rebound chamber 128b of the front right damper 102b, into the fourth rebound chamber 128d of the back right damper 102d, into the first compression chamber 126a of the front left damper 102a, and into the third compression chamber 126c of the back left damper 102c. The resulting pressure difference between the dampers 102a, 102b, 102c, 102d generates damper forces that counteract or resist the roll moment of the vehicle. Additional roll resistance can be added by opening the second seat valve 122b and the second comfort valve 160b as the bi-directional pump 110 is running in the first direction where the bi-directional pump 110 draws in hydraulic fluid from the reservoir hydraulic line 118 and discharges hydraulic fluid into the pump hydraulic line 108 to produce a positive pressure in the pump hydraulic line 108, which increases fluid pressure in the second and third hydraulic circuits 120b, 120c.

During braking, the momentum of the sprung weight of the vehicle tends to make the vehicle pitch or dive forward, compressing the front left damper 102a and the front right damper 102b. When this occurs, fluid flows out from the first compression chamber 126a of the front left damper 102a into the first cross-over hydraulic line 164a and out from the second compression chamber 126b of the front right damper 102b into the second cross-over hydraulic line 164b. As a result of the weight transfer to the front of the vehicle, the back left damper 102c and back right damper 102d begin to extend, causing fluid to flow out of the third rebound chamber 128c of the back left damper 102c into the second cross-over hydraulic line 164b and out of the fourth rebound chamber 128d of the back right damper 102d into the first cross-over hydraulic line 164a. With the four comfort valves 144a, 144b, 144c, 144d adjacent to the dampers 102a, 102b, 102c, 102d and the two comfort valves 160a, 160b located on the load distribution unit 104 all closed, the fluid flow out of the third rebound chamber 128c of the back left damper 102c and the fourth rebound chamber 128d of the back right damper 102d into the first and second cross-over hydraulic lines 164a, 164b increases the pressure in the front left and front right accumulators 142a, 142b, thus providing a passive pitch resistance where it becomes increasingly more difficult to compress the front left damper 102a and the front right damper 102b since the first compression chamber 126a of the front left damper 102a and the second compression chamber 126b of the front right damper 102b are connected in fluid communication with the first and second hydraulic circuits 120a, 120b.

During acceleration, the momentum of the sprung weight of the vehicle tends to make the vehicle pitch or squat rearward (i.e., aft), compressing the back left damper 102c and the back right damper 102d. When this occurs, fluid flows out from the third compression chamber 126c of the back left damper 102c into the fourth cross-over hydraulic line 164d and out of the fourth compression chamber 126d of the back right damper 102d into the third cross-over hydraulic line 164c. As a result of the weight transfer to the back/rear of the vehicle, the front left damper 102a and front right damper 102b begin to extend, causing fluid to flow out of the first rebound chamber 128a of the front left damper 102a into the third cross-over hydraulic line 164c and out of the second rebound chamber 128b of the front right damper 102b into the fourth cross-over hydraulic line 164d. With the four comfort valves 144a, 144b, 144c, 144d adjacent to the dampers 102a, 102b, 102c, 102d and the two comfort valves 160a, 160b located on the load distribution unit 104 all closed, the fluid flow out of the first rebound chamber 128a of the front left damper 102a and the second rebound chamber 128b of the front right damper 102b into the third and fourth cross-over hydraulic lines 164c, 164d increases the pressure in the back left and back right accumulators 142c, 142d, thus providing a passive pitch resistance where it becomes increasingly more difficult to compress the back left damper 102c and the back right damper 102d since the third compression chamber 126c of the back left damper 102c and the fourth compression chamber 126d of the back right damper 102d are connected in fluid communication with the third and fourth hydraulic circuits 120c, 120d.

When active or passive roll and/or pitch stiffness is not required, the four comfort valves 144a, 144b, 144c, 144d adjacent to the dampers 102a, 102b, 102c, 102d and the two comfort valves 160a, 160b located on the load distribution unit 104 can be opened to enhance the ride comfort of the suspension system 100 and reduce or eliminate unwanted suspension movements resulting from the hydraulic coupling of one damper of the system to another damper of the system (e.g., where the compression of one damper causes movement and/or a dampening change in another damper). For example, when the front left comfort valve 144a is open and the front left damper 102a undergoes a compression stroke as the front wheel hits a bump, fluid may flow from the first compression chamber 126a of the front left damper 102a, into the first cross-over hydraulic line 164a, from the first cross-over hydraulic line 164a to the third cross-over hydraulic line 164c by passing through the front left bridge hydraulic line 140a and the front left comfort valve 144a, and into the first rebound chamber 128a of the front left damper 102a. Thus, fluid can travel from the first compression chamber 126a to the first rebound chamber 128a of the front left damper 102a with the only restriction coming from the dampening valves in the rebound and compression chamber ports 130a, 130b of the front left damper 102a. As such, when all of the four comfort valves 144a, 144b, 144c, 144d adjacent to the dampers 102a, 102b, 102c, 102d and the two comfort valves 160a, 160b located on the load distribution unit 104 are open, the dampers 102a, 102b, 102c, 102d are effectively decoupled from one another for improved ride comfort. It should also be appreciated that to return the suspension system 100 to this "comfort mode" of operation, the seat valves 122a, 122b, 122c, 122d and/or the first and second comfort valves 160a, 160b may be opened while the bi-directional pump 110 is running in a second direction where the bi-directional pump 110 draws in hydraulic fluid from the pump hydraulic line 108 and discharges hydraulic fluid into the reservoir hydraulic line 118 to produce a negative pressure in the pump hydraulic line 108 that reduces fluid pressure in the hydraulic circuits 120a, 120b, 120c, 120d of the suspension system 100.

Figure 2:
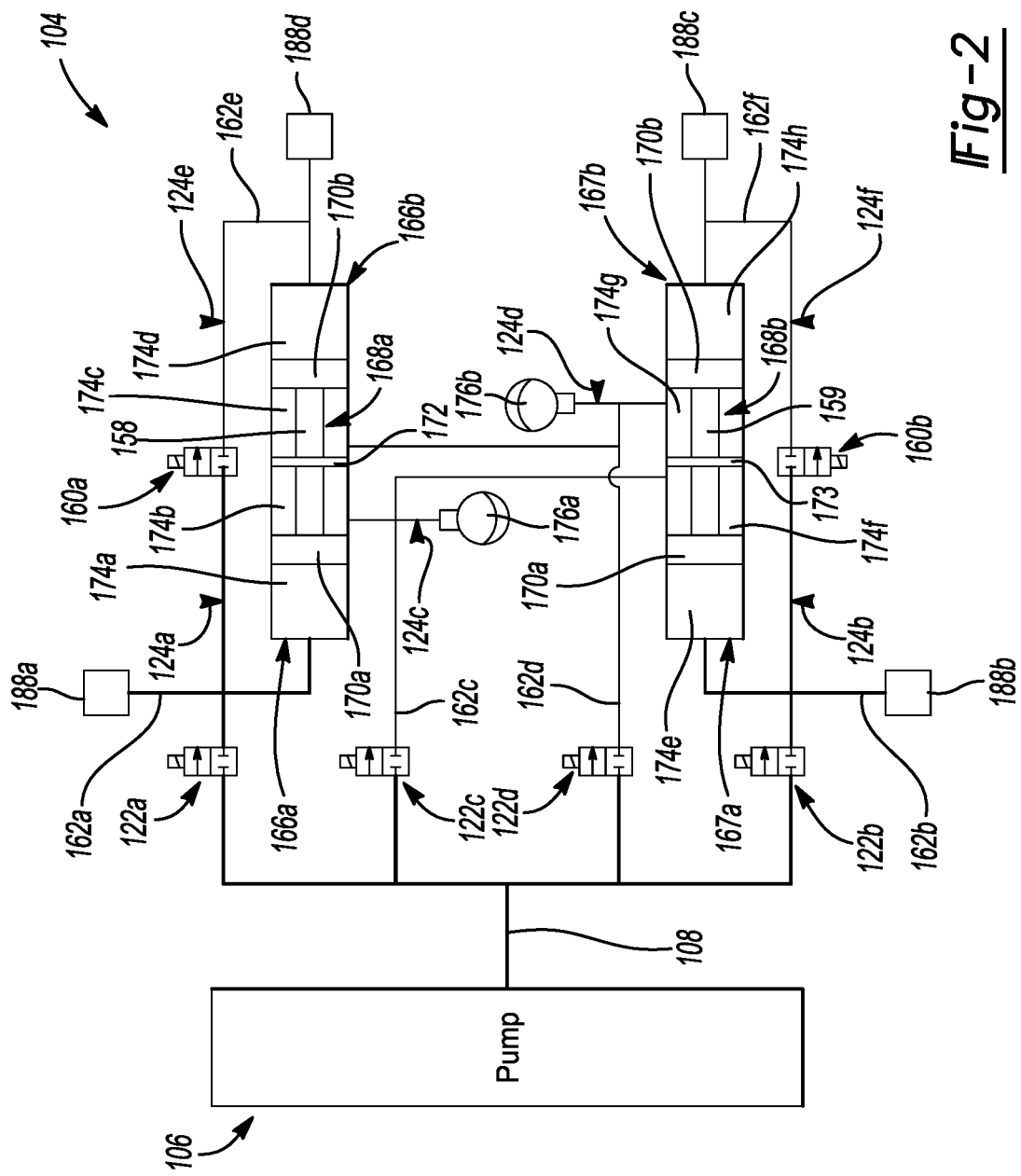
FIG. 2 is a schematic diagram illustrating the exemplary load distribution unit and pump illustrated in FIG. 1.
Figure 3:
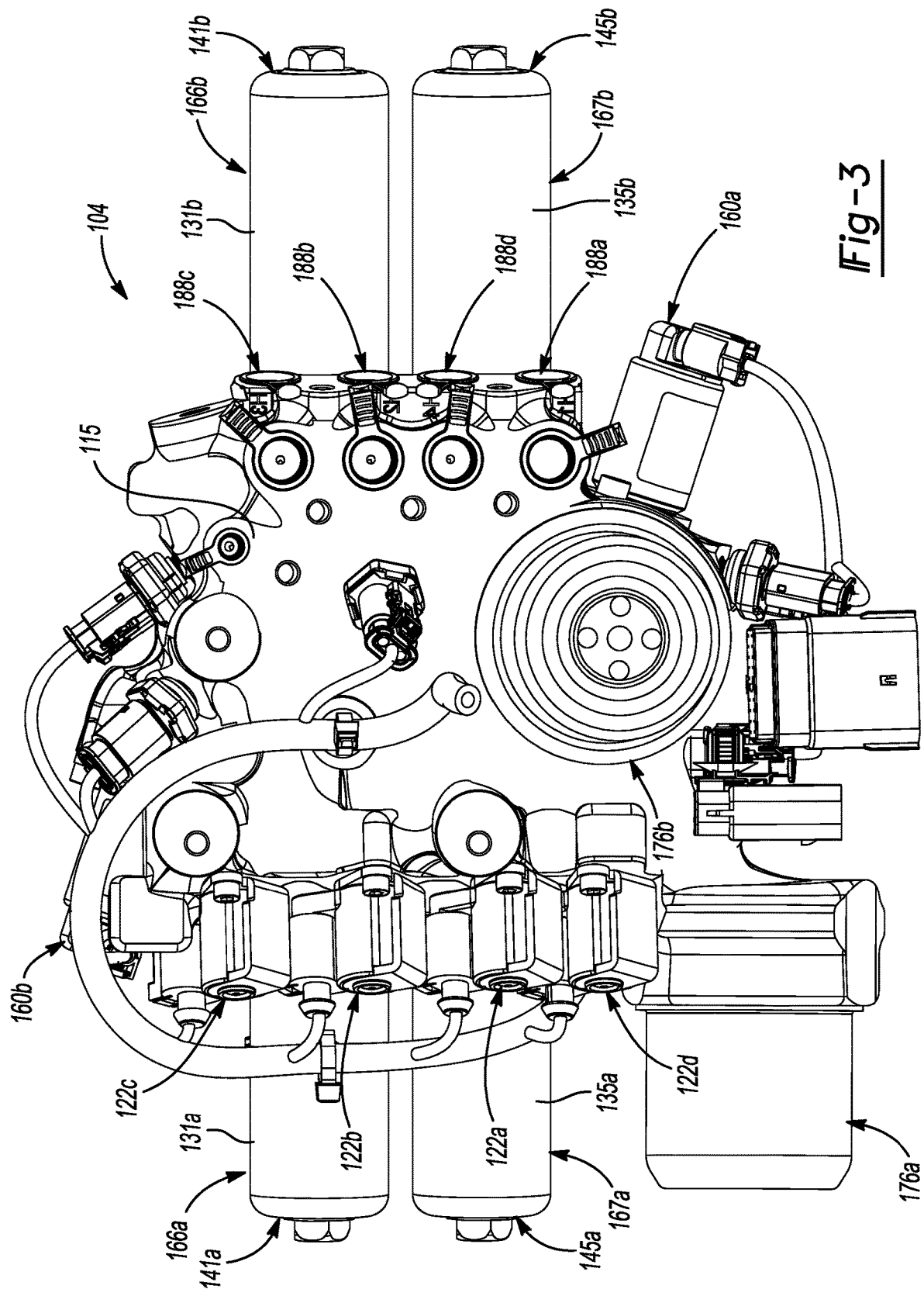
FIG. 3 is a top plan view of the exemplary load distribution unit illustrated in FIG. 2.
Figure 4:
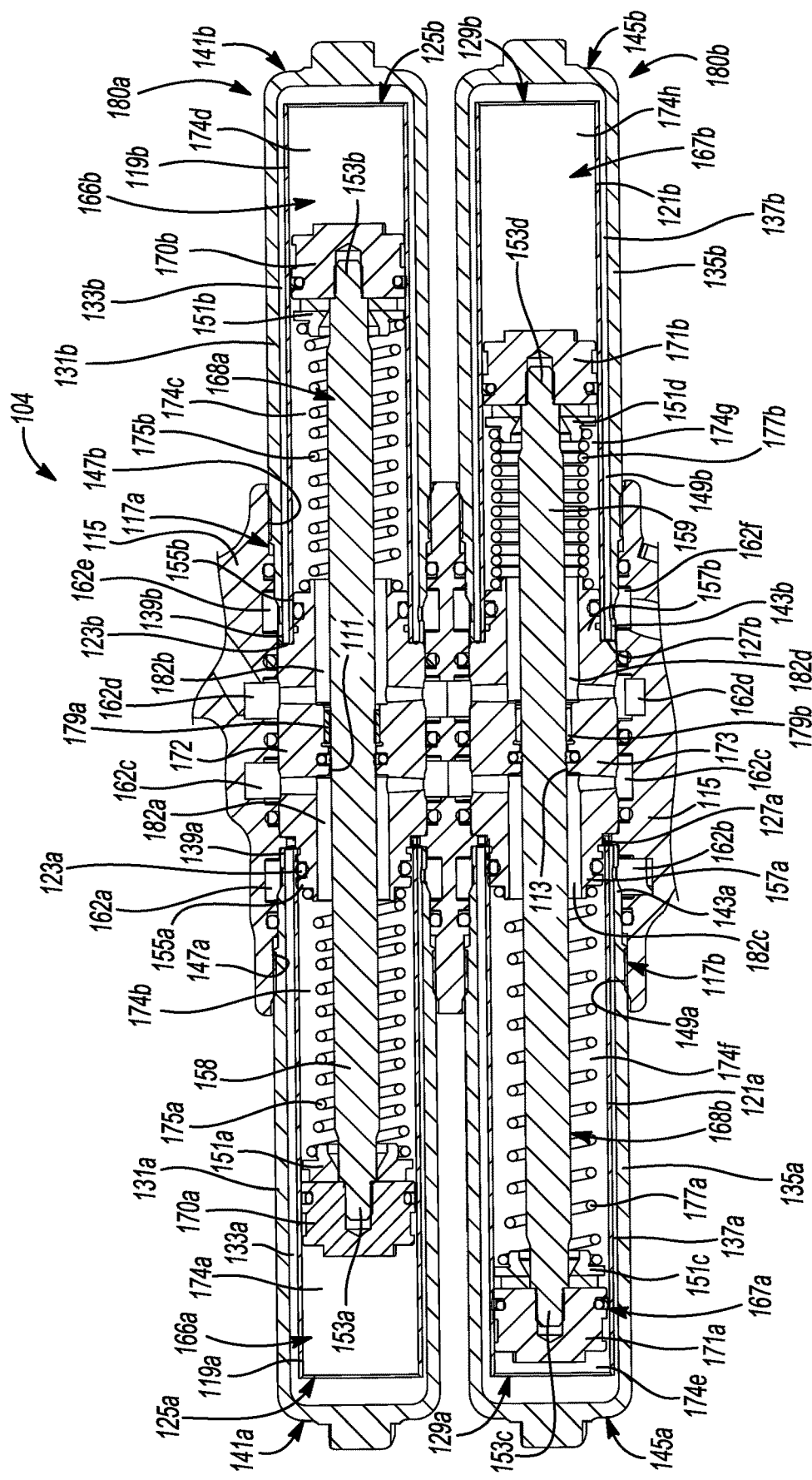
FIG. 4 is a top cross-sectional view of the exemplary load distribution unit illustrated in FIG. 3.

With reference to FIGS. 2-4, the load distribution unit 104 of the suspension system 100 is illustrated in more detail. The load distribution unit 104 includes a first pair of opposed cylinders 166a, 166b and a second pair of opposed cylinders 167a, 167b that slidingly receive first and second piston rod assemblies 168a, 168b, respectively. The first piston rod assembly 168a includes a first piston rod 158 and a first pair of opposed pistons 170a, 170b that are mounted to opposing ends of the first piston rod 158. The second piston rod assembly 168b includes a second piston rod 159 and a second pair of opposed pistons 171a, 171b that are mounted to opposing ends of the second piston rod 159. The first piston rod 158 extends through and is support by a first integral rod guide and pressure tube coupler 172 and the second piston rod 159 extends through and is support by a second integral rod guide and pressure tube coupler 173. Each integral rod guide and pressure tube coupler rod 172, 173 includes a through-bore 111, 113 that slidingly receives one of the piston rods 158, 159.

The first pair of opposed pistons 170a, 170b divides the first pair of opposed cylinders 166a, 166b into four distinct cylinder chambers: a first cylinder chamber 174a that is arranged in fluid communication with the first manifold passageway 162a, a second cylinder chamber 174b that is arranged in fluid communication with the third manifold passageway 162c, a third cylinder chamber 174c that is arranged in fluid communication with the fourth manifold passageway 162d, and a fourth cylinder chamber 174d that is arranged in fluid communication with the fifth manifold passageway 162e. Similarly, the second pair of opposed pistons 171a, 171b divides the second pair of opposed cylinders 167a, 167b into four more distinct cylinder chambers: a fifth cylinder chamber 174e that is arranged in fluid communication with the second manifold passageway 162b, a sixth cylinder chamber 174f that is arranged in fluid communication with the third manifold passageway 162c, a seventh cylinder chamber 174g that is arranged in fluid communication with the fourth manifold passageway 162d, and an eighth cylinder chamber 174h that is arranged in fluid communication with the sixth manifold passageway 162f. As shown in FIG. 4, the first piston rod assembly 168a has a first pair of opposed piston springs 175a, 175b that are co-axially positioned about the first piston rod 158 and extend outwardly from each side of the first integral rod guide and pressure tube coupler 172 to the first pair of opposed pistons 170a, 170b. As such, the first pair of opposed piston springs 175a, 175b are positioned within the second and third cylinder chambers 174b, 174c and naturally bias the first piston rod 158 and the first pair of opposed pistons 170a, 170b to a centered position where the second and third cylinder chambers 174b, 174c and the first and fourth cylinder chambers 174a, 174d have equal volumes. Similarly, the second piston rod assembly 168b has a second pair of opposed piston springs 177a, 177b that are co-axially positioned about the second piston rod 159 and extend outwardly from each side of the second integral rod guide and pressure tube coupler 173 to the second pair of opposed pistons 171a, 171b. As such, the second pair of opposed piston springs 177a, 177b are positioned within the sixth and seventh cylinder chambers 174f, 174g and naturally bias the second piston rod 159 and the second pair of opposed pistons 171a, 171b to a centered position where the fifth and eighth cylinder chambers 174e, 174h and the sixth and seventh piston chambers 174f, 174g have equal volumes.

The first manifold passageway 162a is arranged in fluid communication with the first manifold hydraulic line 138a, the second manifold passageway 162b is arranged in fluid communication with the second manifold hydraulic line 138b, the fifth manifold passageway 162e is arranged in fluid communication with the fourth manifold hydraulic line 138d, and the sixth manifold passageway 162f is arranged in fluid communication with the third manifold hydraulic line 138c. The third manifold passageway 162c is arranged in fluid communication with the second and sixth cylinder chambers 174b, 174f while the fourth manifold passageway 162d is arranged in fluid communication with the third and seventh cylinder chambers 174c, 174g. As a result, fluid pressure in the fourth cylinder chamber 174d and thus the fifth manifold passageway 162e can be increased independently of the first manifold passageway 162a by closing the first comfort valve 160a and opening the fourth seat valve 122d when the bi-directional pump 110 is running in the first direction, which increases pressure in the third cylinder chamber 174c and urges the first piston rod 158 and the first pair of opposed pistons 170a, 170b to the right in FIGS. 2 and 4, decreasing the volume of the fourth cylinder chamber 174d and increasing the pressure in the fourth cylinder chamber 174d. Similarly, fluid pressure in the eighth cylinder chamber 174h and thus the sixth manifold passageway 162f can be increased independently of the second manifold passageway 162b by closing the second comfort valve 160b and opening the fourth seat valve 122d when the bi-directional pump 110 is running in the first direction, which increases pressure in the seventh cylinder chamber 174g and urges the second piston rod 159 and the second pair of opposed pistons 171a, 171b to the right in FIGS. 2 and 4, decreasing the volume of the eighth cylinder chamber 174h and increasing the pressure in the eighth cylinder chamber 174h.

Fluid pressure in the first cylinder chamber 174a and thus the first manifold passageway 162a can also be increased without opening the first seat valve 122a by actuating the first piston rod assembly 168a, where the first comfort valve 160a is closed and the third seat valve 122c is open when the bi-directional pump 110 is running in the first direction, which increases pressure in the second cylinder chamber 174b and urges the first piston rod 158 and the first pair of opposed pistons 170a, 170b to the left in FIGS. 2 and 4, decreasing the volume of the first cylinder chamber 174a and increasing the pressure in the first cylinder chamber 174a. Similarly, fluid pressure in the fifth cylinder chamber 174e and the second manifold passageway 162b can also be increased without opening the second seat valve 122b by actuating the second piston rod assembly 168b, where the second comfort valve 160b is closed and the third seat valve 122c is open when the bi-directional pump 110 is running in the first direction, which increases pressure in the sixth cylinder chamber 174f and urges the second piston rod 159 and the second pair of opposed pistons 171a, 171b to the left in FIGS. 2 and 4, decreasing the volume of the fifth cylinder chamber 174e and increasing the pressure in the second cylinder chamber 174e.

The load distribution unit 104 may further include a first manifold accumulator 176a that is arranged in fluid communication with the third manifold passageway 162c between the third seat valve 122c and the second and sixth cylinder chambers 174b, 174f and a second manifold accumulator 176b that is arranged in fluid communication with the fourth manifold passageway 162d between the third and seventh cylinder chambers 174c, 174g. The first and second manifold accumulators 176a, 176b may be constructed in a number of different ways. For example and without limitation, the first and second manifold accumulators 176a, 176b may have accumulation chambers and pressurized gas chambers that are separated by floating pistons or flexible membranes. Under braking, fluid flow within the four hydraulic circuits 120a, 120b, 120c, 120d generates a pressure difference between the first and second manifold accumulators 176a, 176b, which in turn causes an increase in pressure in the front left and front right accumulators 142a, 142b and provides a pitch stiffness that resists the compression of the front dampers 102a, 102b and rebound/extension of the back dampers 102c, 102d. Under acceleration, fluid flow within the four hydraulic circuits 120a, 120b, 120c, 120d generates an opposite pressure difference between the first and second manifold accumulators 176a, 176b, which in turn causes an increase in pressure in the back left and back right accumulators 142c, 142d and provides a pitch stiffness that resists the rebound/extension of the front dampers 102a, 102b and compression of the back dampers 102c, 102d. Additional pitch resistance can be added before a braking or acceleration event by opening the third and fourth seat valves 122c, 122d as the bi-directional pump 110 is running in the first direction. The bi-directional pump 110 draws in hydraulic fluid from the reservoir hydraulic line 118 and discharges hydraulic fluid into the pump hydraulic line 108 to produce a positive pressure in the pump hydraulic line 108, which increases fluid pressure in the first and second manifold accumulators 176a, 176b. In a similar way, the pitch stiffness of the system can be reduced before a braking or acceleration event by running the bi-directional pump 110 in the second direction while opening the third and fourth seat valves 122c, 122d.

The load distribution unit 104 may also include six pressure sensors 124a, 124b, 124c, 124d, 124e, 124f: a first pressure sensor 124a arranged to monitor fluid pressure in the first manifold passageway 162a, a second pressure sensor 124b arranged to monitor fluid pressure in the second manifold passageway 162b, a third pressure sensor 124c arranged to monitor fluid pressure in the third manifold passageway 162c, a fourth pressure sensor 124d arranged to monitor fluid pressure in the fourth manifold passageway 162d, a fifth pressure sensor 124e arranged to monitor fluid pressure in the fifth manifold passageway 162e, and a sixth pressure sensor 124f arranged to monitor fluid pressure in the sixth manifold passageway 162f. While not shown in FIG. 2, the pressure sensors 124a, 124b, 124c, 124d, 124e, 124f are all electrically connected to the controller.

As seen in FIGS. 3 and 4, the load distribution unit 104 includes a manifold block 115 with first and second cylinder bores 117a, 117b that extend through the manifold block 115 in a parallel and spaced apart relationship. A first pair of pressure tubes 119a, 119b are partially received in the first cylinder bore 117a on opposing sides of the manifold block 115 to define the first pair of opposed cylinders 166a, 166b. A second pair of pressure tubes 121a, 121b are partially received in the second cylinder bore 117b on opposing sides of the manifold block 115 to define the second pair of opposed cylinders 167a, 167b. The first pair of pressure tubes 119a, 119b extend longitudinally between a first pair of inboard pressure tube ends 123a, 123b and a first pair of outboard pressure tube ends 125a, 125b. The second pair of pressure tubes 121a, 121b extend longitudinally between a second pair of inboard pressure tube ends 127a, 127b and a second pair of outboard pressure tube ends 129a, 129b.

In addition, a first pair of reserve tubes 131a, 131b are partially received in the first cylinder bore 117a on opposing sides of the manifold block 115 and are arranged annularly about the first pair of pressure tubes 119a, 119b in a concentric/co-axial arrangement. As such, a first pair of reservoir chambers 133a, 133b are defined between the first pair of pressure tubes 119a, 119b and the first pair of reserve tubes 131a, 131b. A second pair of reserve tubes 135a, 135b are partially received in the second cylinder bore 117b on opposing sides of the manifold block 115 and are arranged annularly about the second pair of pressure tubes 121a, 121b in a concentric/co-axial arrangement. As a result, a second pair of reservoir chambers 137a, 137b are defined between the second pair of pressure tubes 121a, 121b and the second pair of reserve tubes 135a, 135b. The first pair of reserve tubes 131a, 131b extend longitudinally between a first pair of inboard reserve tube ends 139a, 139b and a first pair of outboard reserve tube ends 141a, 141b. The second pair of reserve tubes 135a, 135b extend longitudinally between a second pair of inboard reserve tube ends 143*a*, 143*b* and a second pair of outboard reserve tube ends 145*a*, 145*b*.

The first pair of inboard pressure tube ends 123*a*, 123*b*, the first pair of outboard pressure tube ends 125*a*, 125*b*, the second pair of inboard pressure tube ends 127*a*, 127*b*, and the second pair of outboard pressure tube ends 129*a*, 129*b* are all constructed as open tube ends. In addition, the first pair of inboard reserve tube ends 139*a*, 139*b* and the second pair of inboard reserve tube ends 143*a*, 143*b* are constructed as open tube ends. However, the first pair of outboard reserve tube ends 141*a*, 141*b* and the second pair of outboard reserve tube ends 145*a*, 145*b* are constructed as closed tube ends.

The first cylinder bore 117*a* in the manifold block 115 includes a first pair of counterbores 147*a*, 147*b* of increased diameter and the second cylinder bore 117*b* in the manifold block 115 includes a second pair of counterbores 149*a*, 149*b* of increased diameter. The first pair of inboard reserve tube ends 139*a*, 139*b* are threaded into the first pair of counterbores 147*a*, 147*b* in the manifold block 115 and the second pair of inboard reserve tube ends 143*a*, 143*b* are threaded into the second pair of counterbores 149*a*, 149*b* in the manifold block 115.

The load distribution unit 104 includes a first piston rod assembly 168*a* with a first piston rod 158, a first pair of opposed pistons 170*a*, 170*b* that are mounted on the first piston rod 158, and a first pair of opposed piston springs 175*a*, 175*b*. In the illustrated example, a first pair of spring seats 151*a*, 151*b* are positioned on the first piston rod 158 between the first pair of opposed piston springs 175*a*, 175*b* and the first pair of opposed pistons 170*a*, 170*b* and the first pair of opposed pistons 170*a*, 170*b* are threaded onto a first pair of threaded ends 153*a*, 153*b* on the first piston rod 158. The first pair of opposed pistons 170*a*, 170*b* are slidingly received within the first pair of opposed cylinders 166*a*, 166*b*. The first integral rod guide and pressure tube coupler 172 is received in the first cylinder bore 117*a* in the manifold block 115 until it makes contact with and abuts a shoulder within the cylinder bore 117*a*, which provides a stop. The first integral rod guide and pressure tube coupler 172 includes first through-bore 111. The first piston rod 158 extends through the first through-bore 111 in the first integral rod guide and pressure tube coupler 172 in a sliding fit. The first through-bore 111 in the first integral rod guide and pressure tube coupler 172 may further include a bearing bush 179*a* and one or more seals positioned in grooves in the first through-bore 111. The first pair of inboard pressure tube ends 123*a*, 123*b* are received in the first cylinder bore 117*a* and are retained on opposing ends of the first integral rod guide and pressure tube coupler 172. More specifically, each end of the first integral rod guide and pressure tube coupler 172 includes a boss 155*a*, 155*b* with a reduced diameter. The first pair of inboard pressure tube ends 123*a*, 123*b* are slid over the bosses 155*a*, 155*b* on the opposing ends of the first integral rod guide and pressure tube coupler 172 and are fixed by a notching operation such that the first integral rod guide and pressure tube coupler 172 holds the first pair of pressure tubes 119*a*, 119*b* together in a co-axial arrangement about the first piston rod assembly 168*a* as a first modular pressure tube and piston subassembly 180*a*.

Similarly, the load distribution unit 104 includes a second piston rod assembly 168*b* with a second piston rod 159, a second pair of opposed pistons 171*a*, 171*b* that are mounted on the second piston rod 159, and a second pair of opposed piston springs 177*a*, 177*b*. In the illustrated example, a second pair of spring seats 151*c*, 151*d* are positioned on the second piston rod 159 between the second pair of opposed piston springs 177*a*, 177*b* and the second pair of opposed pistons 171*a*, 171*b* and the second pair of opposed pistons 171*a*, 171*b* are threaded onto a second pair of threaded ends 153*c*, 153*d* on the second piston rod 159. The second pair of opposed pistons 171*a*, 171*b* are slidingly received within the second pair of opposed cylinders 167*a*, 167*b*. The second integral rod guide and pressure tube coupler 173 is received in the second cylinder bore 117*b* in the manifold block 115 until it makes contact with and abuts a shoulder within the cylinder bore 117*b*, which provides a stop. The second integral rod guide and pressure tube coupler 173 includes second through-bore 113. The second piston rod 159 extends through the second through-bore 113 in the second integral rod guide and pressure tube coupler 173 in a sliding fit. The second through-bore 113 in the second integral rod guide and pressure tube coupler 173 may further include a bearing bush 179*b* and one or more seals positioned in grooves in the second through-bore 113. The second pair of inboard pressure tube ends 127*a*, 127*b* are received in the second cylinder bore 117*b* and are retained on opposing ends of the second integral rod guide and pressure tube coupler 173. More specifically, each end of the second integral rod guide and pressure tube coupler 173 includes a boss 157*a*, 157*b* with a reduced diameter. The second pair of inboard pressure tube ends 127*a*, 127*b* are slid over the bosses 157*a*, 157*b* on the opposing ends of the second integral rod guide and pressure tube coupler 173 and are fixed by a notching operation such that the second integral rod guide and pressure tube coupler 173 holds the second pair of pressure tubes 121*a*, 121*b* together in a co-axial arrangement about the first piston rod assembly 168*b* as a second modular pressure tube and piston subassembly 180*b*.

The first pair of reservoir chambers 133*a*, 133*b* includes a first reservoir chamber 133*a* and a second reservoir chamber 133*b*. The second pair of reservoir chambers 137*a*, 137*b* includes a third reservoir chamber 137*a* and a fourth reservoir chamber 137*b*. The first cylinder chamber 174*a* and the first reservoir chamber 133*a* are arranged in fluid communication with one another and collectively form a first pressure chamber 133*a*, 174*a* within the load distribution unit 104 that is arranged in fluid communication with the first manifold passageway 162*a*. The fourth cylinder chamber 174*d* and the second reservoir chamber 133*b* are arranged in fluid communication with one another and collectively form a second pressure chamber 133*b*, 174*d* within the load distribution unit 104 that is arranged in fluid communication with the fifth manifold passageway 162*e*.

The first integral rod guide and pressure tube coupler 172 includes a first rod guide passage 182*a* that extends through the first integral rod guide and pressure tube coupler 172 between the second cylinder chamber 174*b* and the third manifold passageway 162*c* and a second rod guide passage 182*b* that extends through the first integral rod guide and pressure tube coupler 172 between the third cylinder chamber 174*c* and the fourth manifold passageway 162*d*. The second integral rod guide and pressure tube coupler 173 includes a third rod guide passage 182*c* that extends through the second integral rod guide and pressure tube coupler 173 between the sixth cylinder chamber 174*f* and the third manifold passageway 162*c* and a fourth rod guide passage 182*d* that extends through the second integral rod guide and pressure tube coupler 173 between the seventh cylinder chamber 174*g* and the fourth manifold passageway 162*d*. As such, it should be appreciated that the second and sixth cylinder chambers 174*b*, 174*f* are arranged in fluid communication with one another via the first and third rod guide passages 182*a*, 182*c* and the third manifold passageway 162c, which combine to collectively form a third pressure chamber 162c, 174b, 174f, 182a, 182c within said load distribution unit 104. It should also be appreciated that the third and seventh cylinder chambers 174c, 174g are arranged in fluid communication with one another via the second and fourth rod guide passages 182b, 182d and the fourth manifold passageway 162d, which combine to collectively form a fourth pressure chamber 162d, 174c, 174g, 182b, 182d within the load distribution unit 104.

The fifth cylinder chamber 174e and the third reservoir chamber 137a are arranged in fluid communication with one another and collectively form a fifth pressure chamber 137a, 174e within the load distribution unit 104 that is arranged in fluid communication with the second manifold passageway 162b. Finally, the eighth cylinder chamber 174h and the fourth reservoir chamber 137b are arranged in fluid communication with one another and collectively form a sixth pressure chamber 137b, 174h within the load distribution unit 104 that is arranged in fluid communication with the sixth manifold passageway 162f. Thus, the first pressure chamber 133a, 174a of the load distribution unit 104 is arranged in fluid communication with the first hydraulic circuit 120a of the suspension system 100, the second pressure chamber 133b, 174d of the load distribution unit 104 is arranged in fluid communication with the fourth hydraulic circuit 120d of the suspension system 100, the fifth pressure chamber 137a, 174e of the load distribution unit 104 is arranged in fluid communication with the second hydraulic circuit 120b of the suspension system 100, and the sixth pressure chamber 137b, 174h of the load distribution unit 104 is arranged in fluid communication the third hydraulic circuit 120c of the suspension system 100.

The first cylinder chamber 174a and the first reservoir chamber 133a are arranged in fluid communication with a first manifold port 188a that connects with the first manifold hydraulic line 138a. The fifth cylinder chamber 174e and the third reservoir chamber 137a are arranged in fluid communication with a second manifold port 188b that connects with the second manifold hydraulic line 138b. The eighth cylinder chamber 174h and the fourth reservoir chamber 137b are arranged in fluid communication with a third manifold port 188c that connects with the third manifold hydraulic line 138c. The fourth cylinder chamber 174d and the second reservoir chamber 133b are arranged in fluid communication with a fourth manifold port 188d that connects with the fourth manifold hydraulic line 138d.

It should also be appreciated that in FIG. 4, the pressures in the first and fourth cylinder chambers 174a, 174d are substantially the same such that the first piston rod assembly 168a is longitudinally centered in the first cylinder bore 117a of the manifold 115, the first and fourth cylinder chambers 174a, 174d are substantially equivalent in volume, and the first pair of opposed piston springs 175a, 175b are in a substantially equal state of compression. By contrast, in FIG. 4, the pressure in the fifth cylinder chamber 174e is less than the pressure in the eighth cylinder chamber 174h such that the second piston rod assembly 168b is shifted longitudinally to the left in the second cylinder bore 117b of the manifold 115, the fifth cylinder chamber 174e has a smaller volume than the eighth cylinder chamber 174h, and spring 177b is in a greater state of compression than spring 177a.

Figure 5:
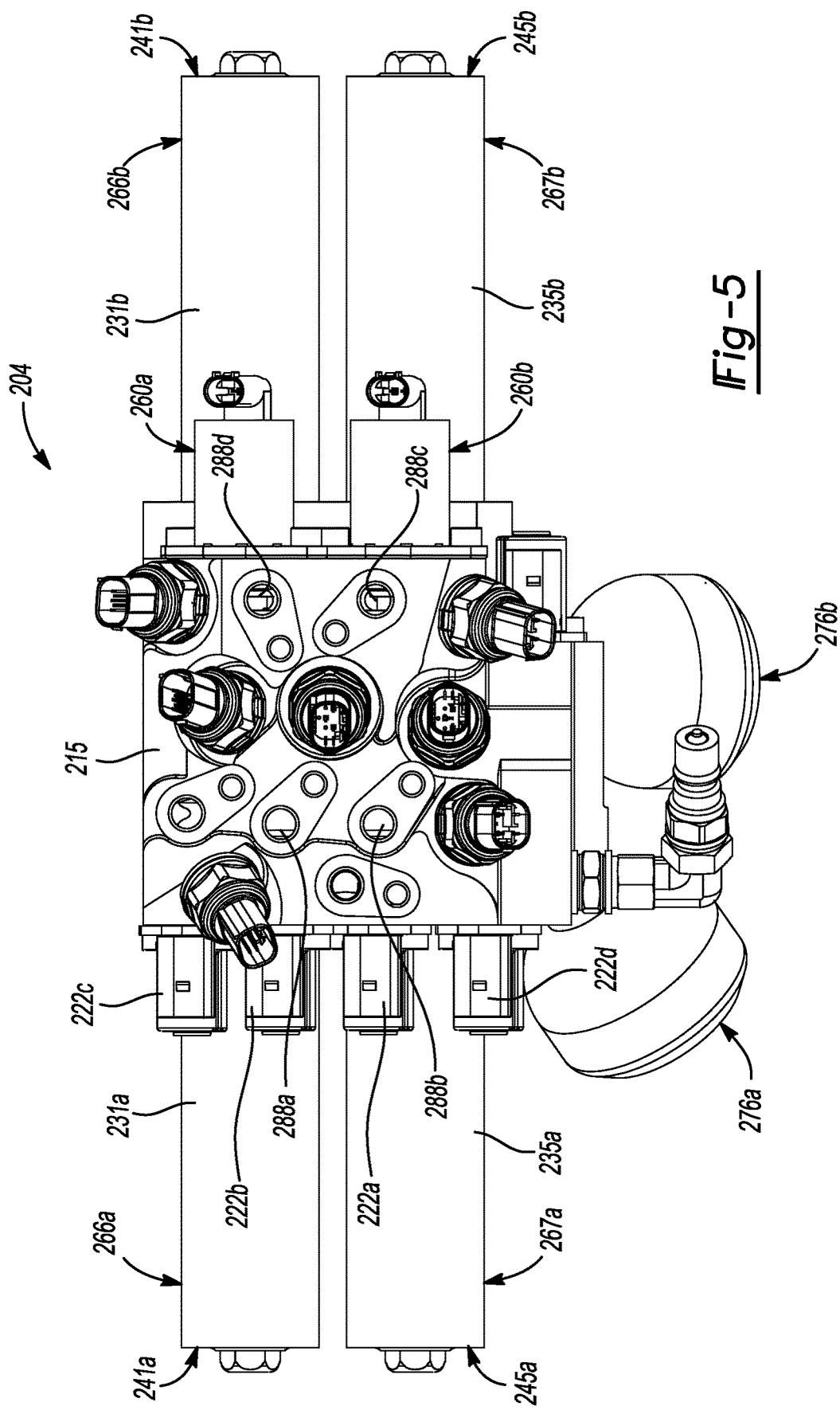
FIG. 5 is a top plan view of another exemplary load distribution unit, which is constructed in accordance with another aspect of the present disclosure.
Figure 6:
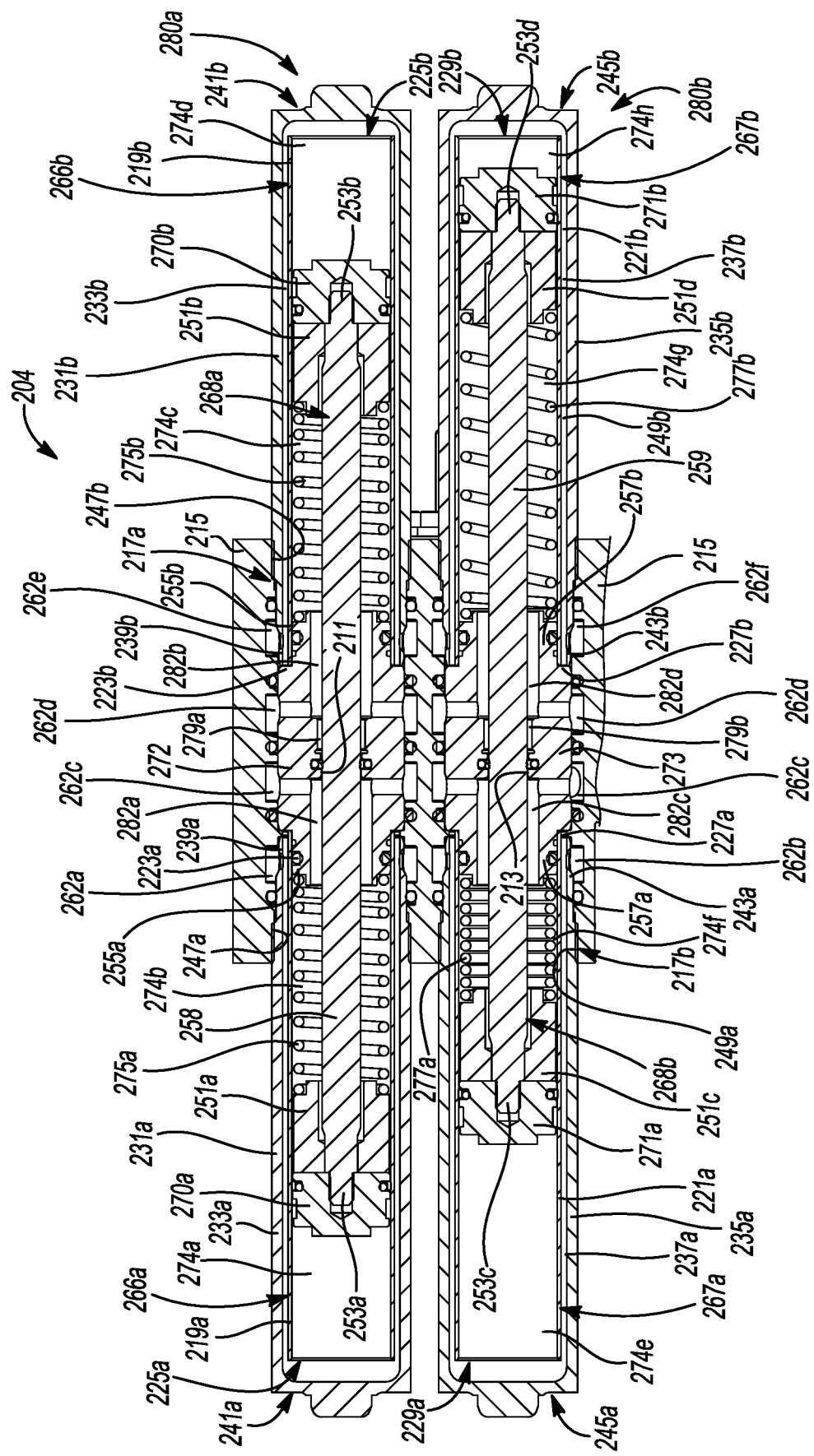
FIG. 6 is a top cross-sectional view of the exemplary load distribution unit illustrated in FIG. 5.

FIGS. 5 and 6 illustrate another load distribution unit 204 that shares many of the same components as the load distribution unit 104 illustrated in FIGS. 3 and 4, but in FIGS. 5 and 6, the load distribution unit 204 has a different configuration. Rather than repeat the description set forth above, the following paragraphs describe the structure and function of the components in FIGS. 5 and 6 that are new and/or different from those shown and described in connection with FIGS. 3 and 4. It should be appreciated that the reference numbers in FIGS. 3 and 4 are "100" series numbers (e.g., 104) whereas the components in FIGS. 5 and 6 that are the same or similar to the components of the load distribution unit 104 shown in FIGS. 3 and 4 share the same base reference numbers, but are listed as "200" series numbers (e.g., 204). Thus, the same description for element 104 above applies to element 204 in FIGS. 5 and 6 and so on and so forth.

The load distribution unit 204 illustrated in FIGS. 5 and 6 includes a manifold block 215 with first and second cylinder bores 217a, 217b that extend through the manifold block 215 in a parallel and spaced apart relationship. A first pair of pressure tubes 219a, 219b are partially received in the first cylinder bore 217a on opposing sides of the manifold block 215 to define the first pair of opposed cylinders 266a, 266b. A second pair of pressure tubes 221a, 221b are partially received in the second cylinder bore 217b on opposing sides of the manifold block 215 to define the second pair of opposed cylinders 267a, 267b. The first pair of pressure tubes 219a, 219b extend longitudinally between a first pair of inboard pressure tube ends 223a, 223b and a first pair of outboard pressure tube ends 225a, 225b. The second pair of pressure tubes 221a, 221b extend longitudinally between a second pair of inboard pressure tube ends 227a, 227b and a second pair of outboard pressure tube ends 229a, 229b.

A first pair of reserve tubes 231a, 231b are partially received in the first cylinder bore 217a on opposing sides of the manifold block 215 and are arranged annularly about the first pair of pressure tubes 219a, 219b in a concentric/co-axial arrangement. As such, a first pair of reservoir chambers 233a, 233b are defined between the first pair of pressure tubes 219a, 219b and the first pair of reserve tubes 231a, 231b. A second pair of reserve tubes 235a, 235b are partially received in the second cylinder bore 217b on opposing sides of the manifold block 215 and are arranged annularly about the second pair of pressure tubes 221a, 221b in a concentric/co-axial arrangement. As a result, a second pair of reservoir chambers 237a, 237b are defined between the second pair of pressure tubes 221a, 221b and the second pair of reserve tubes 235a, 235b. The first pair of reserve tubes 231a, 231b extend longitudinally between a first pair of inboard reserve tube ends 239a, 239b and a first pair of outboard reserve tube ends 241a, 241b. The second pair of reserve tubes 235a, 235b extend longitudinally between a second pair of inboard reserve tube ends 243a, 243b and a second pair of outboard reserve tube ends 245a, 245b.

The first cylinder bore 217a in the manifold block 215 includes a first pair of counterbores 247a, 247b of increased diameter and the second cylinder bore 217b in the manifold block 215 includes a second pair of counterbores 249a, 249b of increased diameter. The first pair of inboard reserve tube ends 239a, 239b are threaded into the first pair of counterbores 247a, 247b in the manifold block 215 and the second pair of inboard reserve tube ends 243a, 243b are thread into the second pair of counterbores 249a, 249b in the manifold block 215.

The load distribution unit 204 includes a first piston rod assembly 268a with a first piston rod 258, a first pair of opposed pistons 270a, 270b that are mounted on a first pair of threaded ends 153a, 153b of the first piston rod 158, a first pair of opposed piston springs 275a, 275b, and a first pair of spring seats 251a, 251b that are positioned on the first piston rod 258 between the first pair of opposed piston springs 275a, 275b and the first pair of opposed pistons 270a, 270b. The first piston rod 258 extends through a first through-bore 211 in a first integral rod guide and pressure tube coupler 272 in a sliding fit. The first through-bore 211 in the first integral rod guide and pressure tube coupler 272 may further include a bearing bush 279a and one or more seals. The first pair of inboard pressure tube ends 223a, 223b are received in the first cylinder bore 217a and are retained on bosses 255a, 255b positioned on opposing ends of the first integral rod guide and pressure tube coupler 272, which holds the first pair of pressure tubes 219a, 219b together in a co-axial arrangement about the first piston rod assembly 268a as a first modular pressure tube and piston subassembly 280a.

The load distribution unit 204 includes a second piston rod assembly 268b with a second piston rod 259, a second pair of opposed pistons 271a, 271b that are mounted on a second pair of threaded ends 253c, 253d on the second piston rod 259, a second pair of opposed piston springs 277a, 277b, and a second pair of spring seats 251c, 251d that are positioned on the second piston rod 259 between the second pair of opposed piston springs 277a, 277b and the second pair of opposed pistons 271a, 271b. The second piston rod 259 extends through a second through-bore 213 in a second integral rod guide and pressure tube coupler 273 in a sliding fit. The second through-bore 213 in the second integral rod guide and pressure tube coupler 273 may further include a bearing bush 279b and one or more seals. The second pair of inboard pressure tube ends 227a, 227b are received in the second cylinder bore 217b and are retained on bosses 257a, 257b positioned on opposing ends of the second integral rod guide and pressure tube coupler 273, which holds the second pair of pressure tubes 221a, 221b together in a co-axial arrangement about the first piston rod assembly 268b as a second modular pressure tube and piston subassembly 280b.

The first pair of opposed pistons 270a, 270b divides the first pair of opposed cylinders 266a, 266b into a first cylinder chamber 274a, a second cylinder chamber 274b, a third cylinder chamber 274c, and a fourth cylinder chamber 274d. Similarly, the second pair of opposed pistons 271a, 271b divides the second pair of opposed cylinders 267a, 267b into a fifth cylinder chamber 274e, a sixth cylinder chamber 274f, a seventh cylinder chamber 274g, and an eighth cylinder chamber 274h. The first cylinder chamber 274a and the first reservoir chamber 233a are arranged in fluid communication with one another and collectively form a first pressure chamber 233a, 274a within the load distribution unit 104, which is arranged in fluid communication with a first manifold passageway 262a that ultimately leads to a first manifold port 288a. The fourth cylinder chamber 274d and the second reservoir chamber 233b are arranged in fluid communication with one another and collectively form a second pressure chamber 233b, 274d within the load distribution unit 204, which is arranged in fluid communication with a fifth manifold passageway 262e that ultimately leads to a fourth manifold port 288d.

A first rod guide passage 282a extends through the first integral rod guide and pressure tube coupler 272 between the second cylinder chamber 274b and a third manifold passageway 262c. A second rod guide passage 282b extends through the first integral rod guide and pressure tube coupler 272 between the third cylinder chamber 274c and a fourth manifold passageway 262d. A third rod guide passage 282c extends through the second integral rod guide and pressure tube coupler 273 between the sixth cylinder chamber 274f and the third manifold passageway 262c. A fourth rod guide passage 282d extends through the second integral rod guide and pressure tube coupler 273 between the seventh cylinder chamber 274g and the fourth manifold passageway 262d. As such, the second and sixth cylinder chambers 274b, 274f are arranged in fluid communication with one another via the first and third rod guide passages 282a, 282c and the third manifold passageway 262c, which combine to collectively form a third pressure chamber 262c, 274b, 274f, 282a, 282c within the load distribution unit 204. It should also be appreciated that the third and seventh cylinder chambers 274c, 274g are arranged in fluid communication with one another via the second and fourth rod guide passages 282b, 282d and the fourth manifold passageway 262d, which combine to collectively form a fourth pressure chamber 262d, 274c, 274g, 282b, 282d within the load distribution unit 204.

The fifth cylinder chamber 274e and the third reservoir chamber 237a are arranged in fluid communication with one another and collectively form a fifth pressure chamber 237a, 274e within the load distribution unit 204, which is arranged in fluid communication with a second manifold passageway 262b that ultimately leads to a second manifold port 288b. Finally, the eighth cylinder chamber 274h and the fourth reservoir chamber 237b are arranged in fluid communication with one another and collectively form a sixth pressure chamber 237b, 274h within the load distribution unit 204, which is arranged in fluid communication with a sixth manifold passageway 262f that ultimately leads to a third manifold port 288c.

The load distribution unit 204 includes four seat valves 222a, 222b, 222c, 222d, two comfort valves 260a, 260b, and two manifold accumulators 276a, 276b. Together, these components regulate fluid pressure and flow within the load distribution unit 204. It should be appreciated that in FIG. 6, the pressures in the first and fourth cylinder chambers 274a, 274d are substantially the same such that the first piston rod assembly 268a is longitudinally centered in the first cylinder bore 217a of the manifold 215, the first and fourth cylinder chambers 274a, 274d are substantially equivalent in volume, and the first pair of opposed piston springs 275a, 275b are in a substantially equal state of compression. By contrast, in FIG. 6, the pressure in the fifth cylinder chamber 274e is greater than the pressure in the eighth cylinder chamber 274h such that the second piston rod assembly 268b is shifted longitudinally to the right in the second cylinder bore 217b of the manifold 215, the fifth cylinder chamber 274e has a larger volume than the eighth cylinder chamber 174h, and spring 177a is in a greater state of compression than spring 177b.

Figure 7:
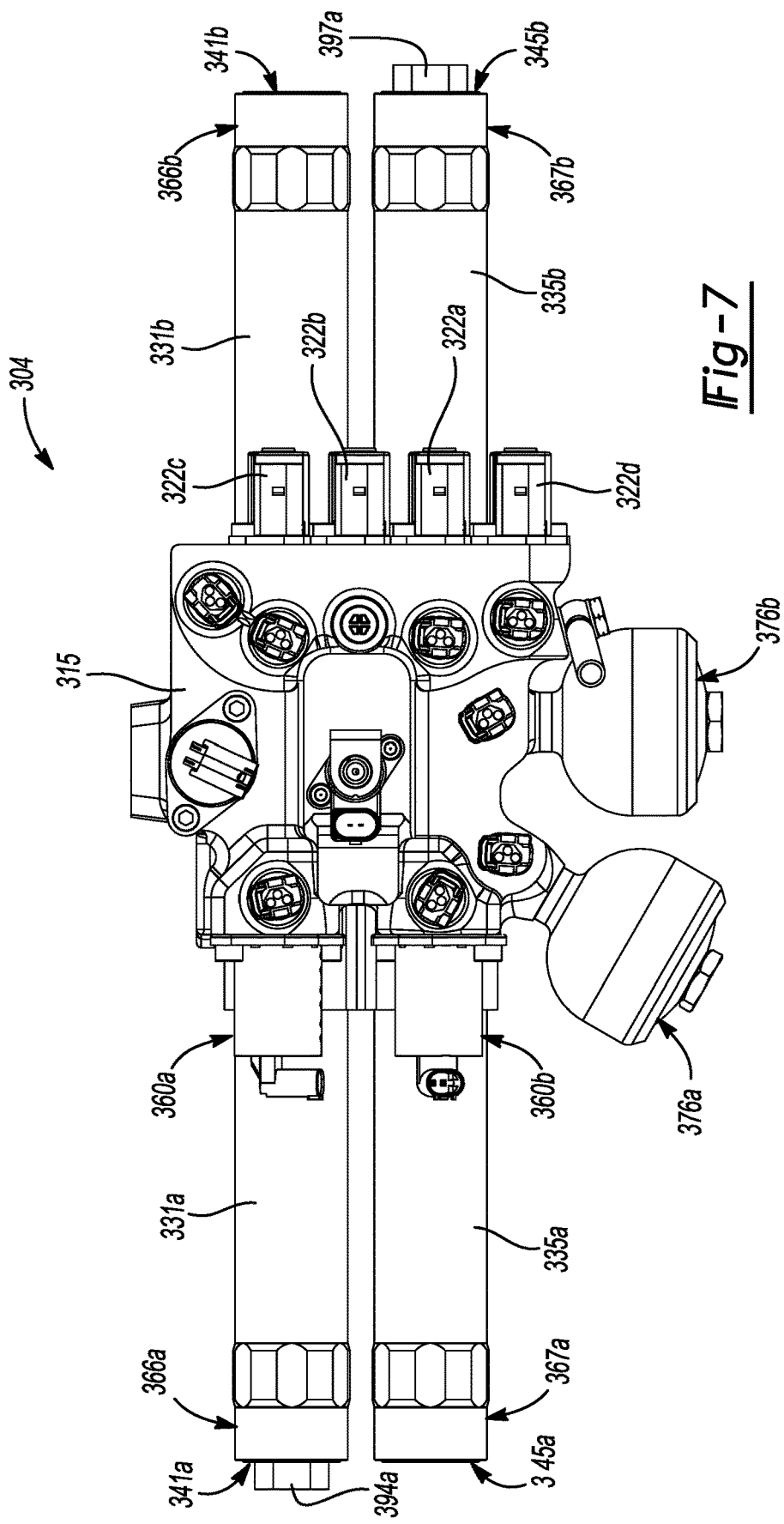
FIG. 7 is a top plan view of another exemplary load distribution unit, which is constructed in accordance with another aspect of the present disclosure.
Figure 8:
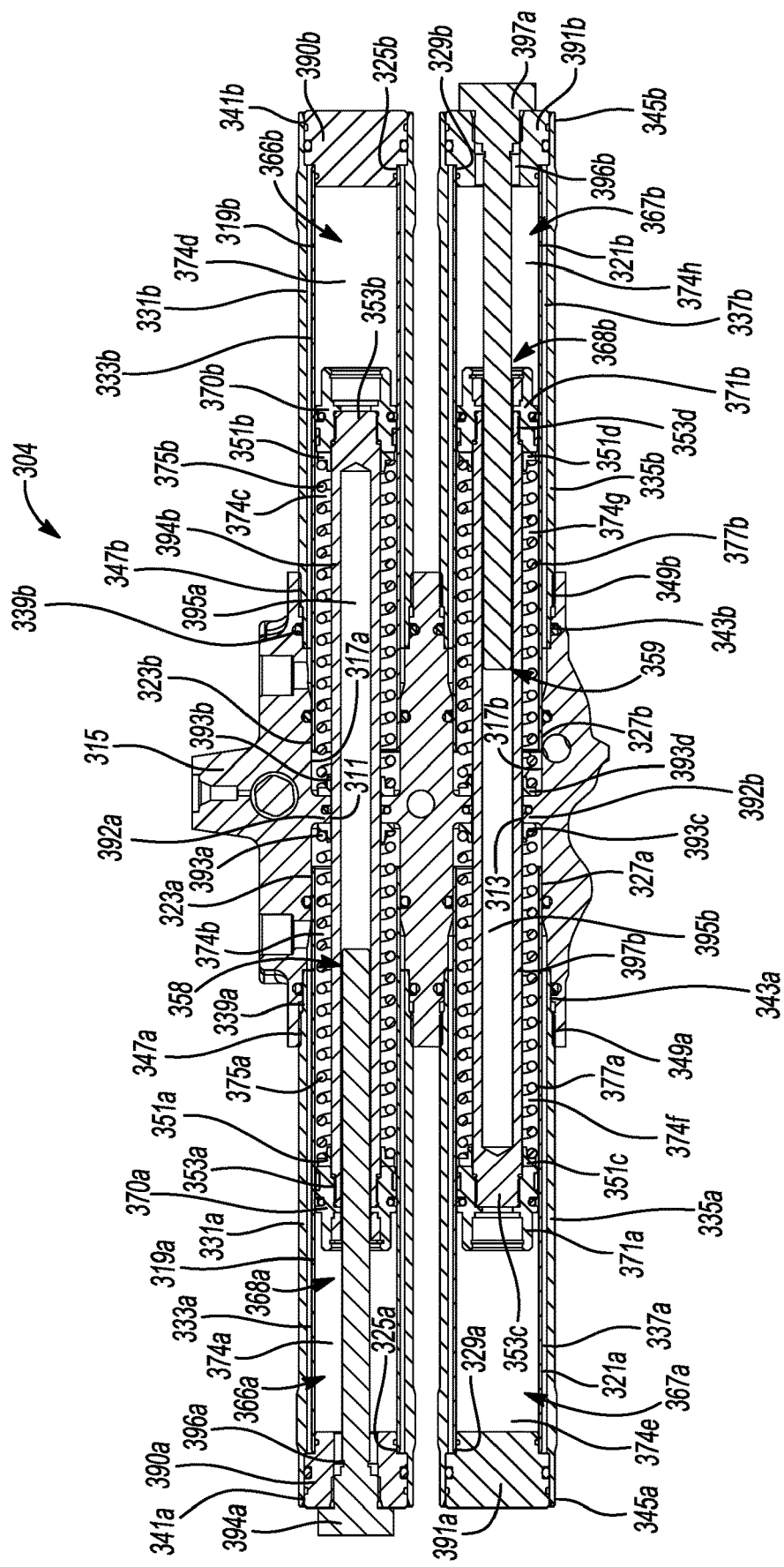
FIG. 8 is a top cross-sectional view of the exemplary load distribution unit illustrated in FIG. 7.

FIGS. 7 and 8 illustrate another load distribution unit 304 that shares many of the same components as the load distribution units 104, 204 illustrated in FIGS. 3-6, but in FIGS. 7 and 8, the load distribution unit 304 has telescopic piston rods 358, 359 and does not include the integral rod guide and pressure tube couplers described above. Rather than repeat the description set forth above, the following paragraphs describe the structure and function of the components in FIGS. 7 and 8 that are new and/or different from those shown and described in connection with FIGS. 3-6. It should be appreciated that the reference numbers in FIGS. 3 and 4 are "100" series numbers (e.g., 104) and the reference numbers in FIGS. 5 and 6 are "200" series numbers (e.g., 204), whereas the components in FIGS. 7 and 8 that are the same or similar to the components of the load distribution units 104, 204 shown in FIGS. 3-6 share the same base reference numbers, but are listed as "300" series numbers (e.g., 304). Thus, the same description for elements 104 and 204 above applies to element 304 in FIGS. 7 and 8 and so on and so forth.

The load distribution unit 304 illustrated in FIGS. 7 and 8 includes a manifold block 315 with first and second cylinder bores 317a, 317b that extend through the manifold block 315 in a parallel and spaced apart relationship. A first pair of pressure tubes 319a, 319b are partially received in the first cylinder bore 317a on opposing sides of the manifold block 315 to define the first pair of opposed cylinders 366a, 366b. A second pair of pressure tubes 321a, 321b are partially received in the second cylinder bore 317b on opposing sides of the manifold block 315 to define the second pair of opposed cylinders 367a, 367b. The first pair of pressure tubes 319a, 319b extend longitudinally between a first pair of inboard pressure tube ends 323a, 323b and a first pair of outboard pressure tube ends 325a, 325b. The second pair of pressure tubes 321a, 321b extend longitudinally between a second pair of inboard pressure tube ends 327a, 327b and a second pair of outboard pressure tube ends 329a, 329b.

A first pair of reserve tubes 331a, 331b are partially received in the first cylinder bore 317a on opposing sides of the manifold block 315 and are arranged annularly about the first pair of pressure tubes 319a, 319b in a concentric/co-axial arrangement. As such, a first pair of reservoir chambers 333a, 333b are defined between the first pair of pressure tubes 319a, 319b and the first pair of reserve tubes 331a, 331b. A second pair of reserve tubes 335a, 335b are partially received in the second cylinder bore 317b on opposing sides of the manifold block 315 and are arranged annularly about the second pair of pressure tubes 321a, 321b in a concentric/co-axial arrangement. As a result, a second pair of reservoir chambers 337a, 337b are defined between the second pair of pressure tubes 321a, 321b and the second pair of reserve tubes 335a, 335b. The first pair of reserve tubes 331a, 331b extend longitudinally between a first pair of inboard reserve tube ends 339a, 339b and a first pair of outboard reserve tube ends 341a, 341b. The second pair of reserve tubes 335a, 335b extend longitudinally between a second pair of inboard reserve tube ends 343a, 343b and a second pair of outboard reserve tube ends 345a, 345b.

The first cylinder bore 317a in the manifold block 315 includes a first pair of counterbores 347a, 347b of increased diameter and the second cylinder bore 317b in the manifold block 315 includes a second pair of counterbores 349a, 349b of increased diameter. The first pair of inboard reserve tube ends 339a, 339b are threaded into the first pair of counterbores 347a, 347b in the manifold block 315 and the second pair of inboard reserve tube ends 343a, 343b are threaded into the second pair of counterbores 349a, 349b in the manifold block 315. Meanwhile, the first pair of inboard pressure tube ends 323a, 323b are threaded into the first cylinder bore 317a in the manifold block 315 and the second pair of inboard pressure tube ends 325a, 325b are threaded into the second cylinder bore 317b in the manifold block 315. The first pair of opposed cylinders 366a, 366b are closed off and sealed by a first pair of end caps 390a, 390b, which include a smaller diameter portion that is press-fit into the first pair of outboard pressure tube ends 325a, 325b and a larger diameter portion that is press-fit into the first pair of outboard reserve tube ends 341a, 341b. The second pair of opposed cylinders 367a, 367b are closed off and sealed by a second pair of end caps 391a, 391b, which include a smaller diameter portion that is press-fit into the second pair of outboard pressure tube ends 329a, 329b and a larger diameter portion that is press-fit into the second pair of outboard reserve tube ends 345a, 345b. The manifold block 315 also includes a first chamber divider 392a that divides the first cylinder bore 317a into two chambers and a second chamber divider 392b that divides the second cylinder bore 317b into two chambers.

The load distribution unit 304 includes a first piston rod assembly 368a with a first telescopic piston rod 358, a first pair of opposed pistons 370a, 370b, a first pair of opposed piston springs 375a, 375b, a first pair of spring seats 351a, 351b that are positioned between the first pair of opposed piston springs 375a, 375b and the first pair of opposed pistons 370a, 370b, and a second pair of spring seats 393a, 393b that are positioned between the first pair of opposed piston springs 375a, 375b and the first chamber divider 392a. The first telescopic piston rod 358 includes a first fixed segment 394a that extends through and is secured to end cap 390a and a first floating segment 394b that is arranged co-axially about and is free to slide relative to and along the first fixed segment 394a of the first telescopic piston rod 358. In other words, the first floating segment 394b of the first telescopic piston rod 358 includes a first piston rod bore 395a that slidingly receives the first fixed segment 394a of the first telescopic piston rod 358. In the illustrated example, the first floating segment 394b of the first telescopic piston rod 358 is slidingly received in a first throughbore 311 in the first chamber divider 392a while the first fixed segment 394a of the first telescopic piston rod 358 threadingly engages a first threaded bore 396a in end cap 390a. The first pair of opposed pistons 370a, 370b are mounted on a first pair of threaded ends 353a, 353b on the first floating segment 394b of the first telescopic piston rod 358.

The load distribution unit 304 includes a second piston rod assembly 368b with a second telescopic piston rod 359, a second pair of opposed pistons 371a, 371b, a second pair of opposed piston springs 377a, 377b, a third pair of spring seats 351c, 351d that are positioned between the second pair of opposed piston springs 377a, 377b and the second pair of opposed pistons 371a, 371b, and a fourth pair of spring seats 393c, 393d that are positioned between the second pair of opposed piston springs 377a, 377b and the second chamber divider 392b. The second telescopic piston rod 359 includes a first fixed segment 397a that extends through and is secured to end cap 391b and a second floating segment 397b that is arranged co-axially about and is free to slide relative to and along the second fixed segment 397a of the second telescopic piston rod 359. In other words, the second floating segment 397b of the second telescopic piston rod 359 includes a second piston rod bore 395b that slidingly receives the second fixed segment 397a of the second telescopic piston rod 359. In the illustrated example, the second floating segment 397b of the second telescopic piston rod 359 is slidingly received in a second throughbore 313 in the second chamber divider 392b while the second fixed segment 397a of the second telescopic piston rod 359 threadingly engages a second threaded bore 396b in end cap 391b. The second pair of opposed pistons 371a, 371b are mounted on a second pair of threaded ends 353c, 353d on the second floating segment 397b of the second telescopic piston rod 359.

The first pair of opposed pistons 370a, 370b divides the first pair of opposed cylinders 366a, 366b into a first cylinder chamber 374a, a second cylinder chamber 374b, a third cylinder chamber 374c, and a fourth cylinder chamber 374d. Similarly, the second pair of opposed pistons 371a, 371b divides the second pair of opposed cylinders 367a, 367b into a fifth cylinder chamber 374e, a sixth cylinder chamber 374f, a seventh cylinder chamber 374g, and an eighth cylinder chamber 374h. The load distribution unit 304 also includes four seat valves 322a, 322b, 322c, 322d, two comfort valves 360a, 360b, and two manifold accumulators 376a, 376b. Together, these components regulate fluid pressure and flow within the load distribution unit 304.

It should be appreciated that in FIG. 8, the pressures in the first and fourth cylinder chambers 374a, 374d are substantially the same such that the first piston rod assembly 368a is longitudinally centered in the first cylinder bore 317a of the manifold block 315, the first and fourth cylinder chambers 374a, 374d are substantially equivalent in volume, and the first pair of opposed piston springs 375a, 375b are in a substantially equal state of compression. Similarly, in FIG. 8, the pressures in the fifth and eighth cylinder chambers 374e, 374h are substantially the same such that the second piston rod assembly 368b is longitudinally centered in the second cylinder bore 317b of the manifold block 315, the fifth and eighth cylinder chambers 374e, 374h are substantially equivalent in volume, and the second pair of opposed piston springs 377a, 377b are in a substantially equal state of compression.

Figure 9:
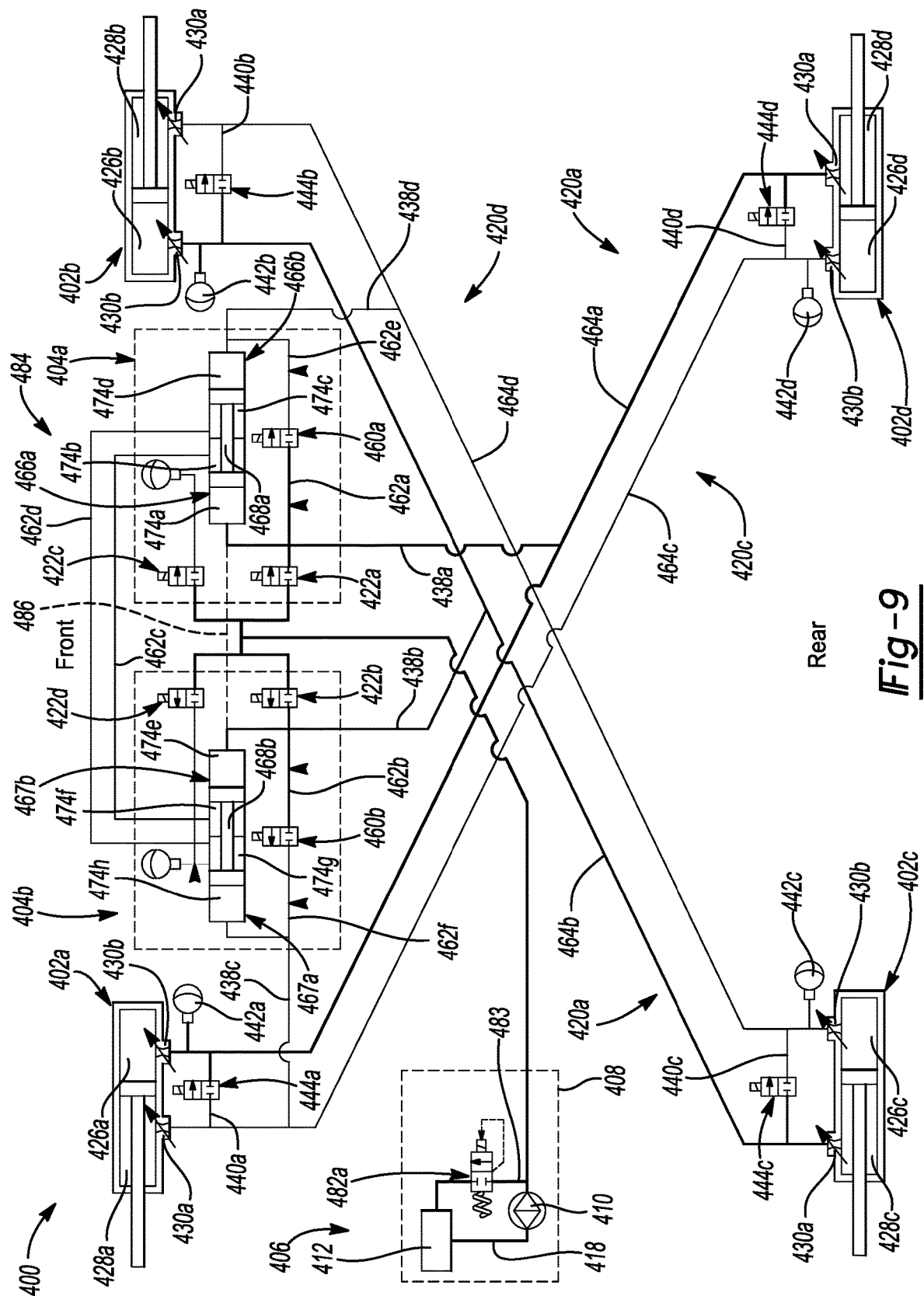
FIG. 9 is a schematic diagram illustrating another exemplary suspension system of the present disclosure that includes four hydraulic circuits connecting the front and rear dampers and a pair of split load distribution units positioned between the front dampers.

FIG. 9 illustrates another suspension system 400 that shares many of the same components as the suspension system 100 illustrated in FIG. 1, but in FIG. 9 a pair of split load distribution units 404a, 404b have been utilized, which collectively form a suspension control system 484. Rather than repeat the description set forth above, the following paragraphs describe the structure and function of the components in FIG. 9 that are new and/or different from those shown and described in connection with FIG. 1. It should be appreciated that the reference numbers in FIG. 1 are "100" series numbers (e.g., 104) whereas the components in FIG. 9 that are the same or similar to the components of the suspension system 100 shown in FIG. 1 share the same base reference numbers, but are listed as "400" series numbers (e.g., 404a, 404b). Thus, the same description for element 100 above applies to element 400 in FIG. 9 and so on and so forth.

The load distribution unit 404 illustrated in FIG. 9 has the same function and many of the same components as the load distribution unit 104 illustrated in FIG. 1, but in FIG. 9 there are a pair of split load distribution units 404a, 404b, which allows the load distribution units 404a, 404b to be packaged in the front of the vehicle between the front dampers 402a, 402b, in the rear of the vehicle between the rear dampers 402c, 402d, or in alternative locations, if desired. The first split load distribution unit 404a includes the first pair of opposed cylinders 466a, 466b, the first piston rod assembly 468a, the first seat valve 422a, the third seat valve 422c, the first comfort valve 460a, and the first manifold accumulator 476a. The second split load distribution unit 404b includes the second pair of opposed cylinders 467a, 467b, the second piston rod assembly 468b, the second seat valve 422b, the fourth seat valve 422d, and the second comfort valve 460b. The pump hydraulic line 408 extends between the split load distribution units 404a, 404b and splits (T's) to connect to the seat valves 422a, 422b, 422c, 422d on either side. Third and fourth manifold conduits 462c, 462d extend laterally between the split load distribution units 404a, 404b to connect the second and sixth cylinder chambers 474b, 474f and the third and seventh cylinder chambers 474c, 474g, respectively. It should be appreciated that the order/right-to-left arrangement of the cylinder chambers 474e, 474f, 474g, 474h in the second split load distribution unit 404b shown in FIG. 9 is opposite from that shown in FIGS. 1 and 2. In other words, in accordance with the arrangement shown in FIG. 9, the first cylinder chamber 474a, which is connected in fluid communication with a first manifold conduit 462a, faces the fifth cylinder chamber 474e, which is connected in fluid communication with a second manifold conduit 462b. In other words, in FIG. 9 the fifth cylinder chamber 474e, which is connected in fluid communication with the second manifold conduit 462b, is to the right of the eighth cylinder chamber 474h, which is connected in fluid communication with the sixth manifold conduit 462f, whereas in FIG. 1 the fifth cylinder chamber 174e, which is connected in fluid communication with the second manifold passageway 162b, is to the left of the eighth cylinder chamber 174h, which is connected in fluid communication with the sixth manifold passageway 162f. This reversal of the arrangement of the cylinder chambers 474e, 474f, 474g, 474h in the second split load distribution unit 404b simplifies and shortens the runs required for the manifold conduits 462a, 462b, 462c, 462d, 462e, 462f and is therefore advantageous.

Thus, the first split load distribution unit 404a is configured to be arranged in fluid communication with the dampers 402a-402d through connections to the first and fourth hydraulic circuits 420a, 420d. The second split load distribution unit 404b is configured to be arranged in fluid communication with the dampers 402a-402d through connections to the second and third hydraulic circuits 420b, 420c. Each split load distribution unit 404a, 404b includes a manifold block with a cylinder bore, a pair of pressure tubes, a piston rod assembly, and a pair of reserve tubes. The first and second split load distribution units 404a, 404b may be positioned in an end-to-end arrangement where the first piston rod assembly 468a and the second piston rod assembly 468b are aligned with one another along a common axis 886.

Figure 10:
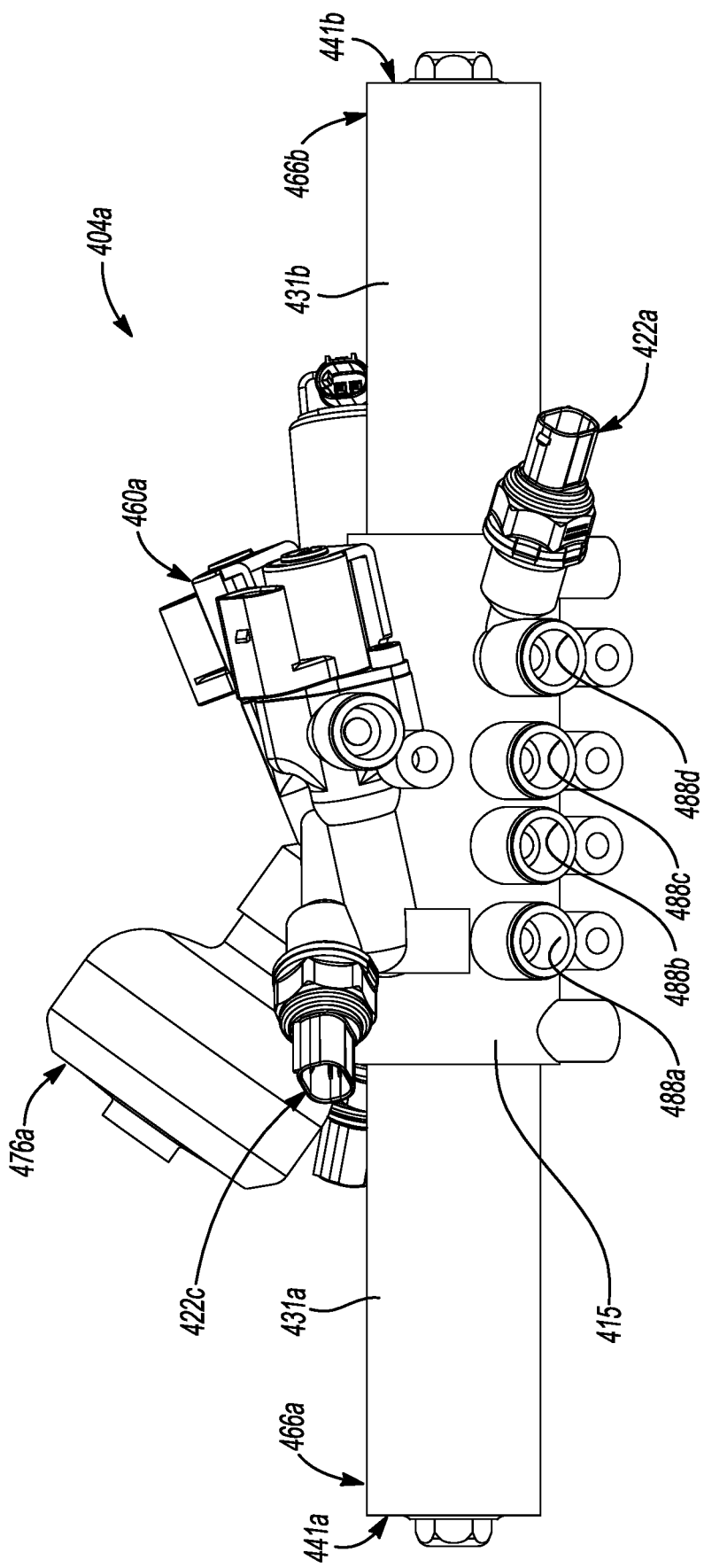
FIG. 10 is a top plan view of one of the exemplary load distribution units illustrated in FIG. 9.
Figure 11:
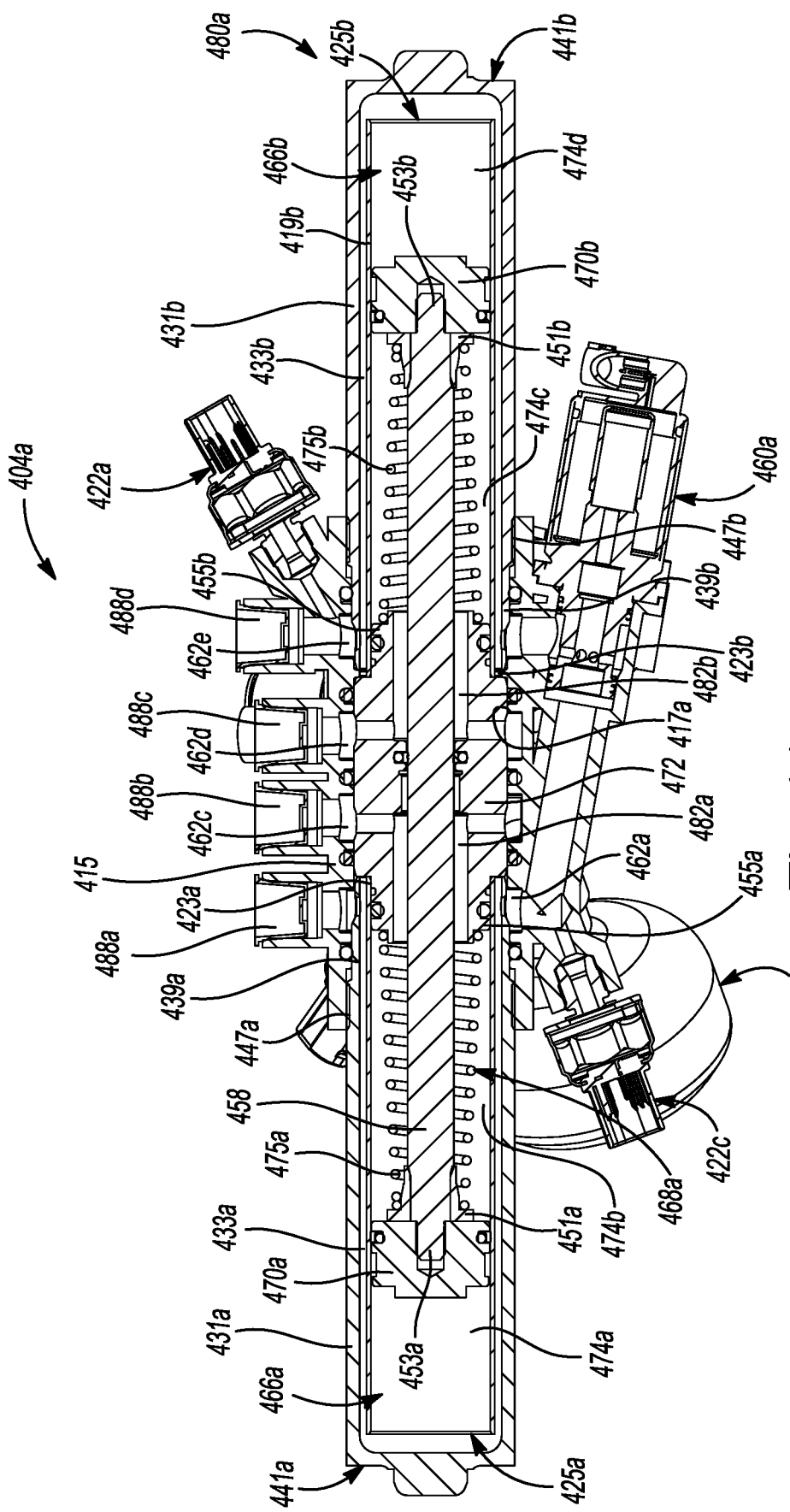
FIG. 11 is a top cross-sectional view of the exemplary load distribution unit illustrated in FIG. 10.

FIGS. 10 and 11 illustrate the first split load distribution unit 404a; however, it should be appreciated that the second split load distribution unit 404b has an identical construction. The first split load distribution unit 404a shown in FIGS. 10 and 11 includes a manifold block 415 with a first cylinder bore 417a that extends longitudinally through the manifold block 415. A first pair of pressure tubes 419a, 419b are partially received in the first cylinder bore 417a on opposing sides of the manifold block 415 to define the first pair of opposed cylinders 466a, 466b. The first pair of pressure tubes 419a, 419b extend longitudinally between a first pair of inboard pressure tube ends 423a, 423b and a first pair of outboard pressure tube ends 425a, 425b. A first pair of reserve tubes 431a, 431b are also partially received in the first cylinder bore 417a on opposing sides of the manifold block 415 and are arranged annularly about the first pair of pressure tubes 419a, 419b in a concentric/co-axial arrangement. As such, a first pair of reservoir chambers 433a, 433b are defined between the first pair of pressure tubes 419a, 419b and the first pair of reserve tubes 431a, 431b.

In particular, the first pair of reserve tubes 431a, 431b extend longitudinally between a first pair of inboard reserve tube ends 439a, 439b and a first pair of outboard reserve tube ends 441a, 441b. The first pair of inboard pressure tube ends 423a, 423b, the first pair of outboard pressure tube ends 425a, 425b, and the first pair of inboard reserve tube ends 439a, 439b are constructed as open tube ends. By contrast, the first pair of outboard reserve tube ends 441a, 441b are constructed as closed tube ends. The first cylinder bore 417a in the manifold block 415 includes a first pair of counterbores 447a, 447b of increased diameter and the first pair of inboard reserve tube ends 439a, 439b are threaded into the first pair of counterbores 447a, 447b in the manifold block 415.

The first split load distribution unit 404a includes a first piston rod assembly 468a with a first piston rod 458, a first pair of opposed pistons 470a, 470b that are mounted on the first piston rod 458, and a first pair of opposed piston springs 475a, 475b. In the illustrated example, a first pair of spring seats 451a, 451b are positioned on the first piston rod 458 between the first pair of opposed piston springs 475a, 475b and the first pair of opposed pistons 470a, 470b and the first pair of opposed pistons 470a, 470b are threaded onto a first pair of threaded ends 453a, 453b on the first piston rod 458. The first pair of opposed pistons 470a, 470b are slidingly received within the first pair of opposed cylinders 466a, 466b. A first integral rod guide and pressure tube coupler 472 is received in the first cylinder bore 417a in the manifold block 415 until it makes contact with and abuts a shoulder within the cylinder bore 417a, which provides a stop. The first integral rod guide and pressure tube coupler 472 includes a first through-bore 411. The first piston rod 458 extends through the first through-bore 411 in the first integral rod guide and pressure tube coupler 472 in a sliding fit. The first through-bore 411 in the first integral rod guide and pressure tube coupler 472 may further include a bearing bush 479 and one or more seals positioned in grooves in the first through-bore 411. The first pair of opposed piston springs 475a, 475b gradually decrease in diameter moving from the first integral rod guide and pressure tube coupler 472 towards the first pair of spring seats 451a, 451b. The first pair of inboard pressure tube ends 423a, 423b are received in the first cylinder bore 417a and are retained on opposing ends of the first integral rod guide and pressure tube coupler 472. More specifically, each end of the first integral rod guide and pressure tube coupler 472 includes a boss 455a, 455b with a reduced diameter. The first pair of inboard pressure tube ends 423a, 423b are slid over the bosses 455a, 455b on the opposing ends of the first integral rod guide and pressure tube coupler 472 and are fixed by a notching operation such that the first integral rod guide and pressure tube coupler 472 holds the first pair of pressure tubes 419a, 419b together in a co-axial arrangement about the first piston rod assembly 468a as a first modular pressure tube and piston subassembly 480a.

The first pair of reservoir chambers 433a, 433b includes a first reservoir chamber 433a and a second reservoir chamber 433b. The first cylinder chamber 474a and the first reservoir chamber 433a are arranged in fluid communication with one another and collectively form a first pressure chamber 433a, 474a within the first split load distribution unit 404a that is arranged in fluid communication with a first manifold port 488a that connects with the first manifold conduit 462a. The first integral rod guide and pressure tube coupler 472 includes a first rod guide passage 482a and a second rod guide passage 182b. The first rod guide passage 482a extends through the first integral rod guide and pressure tube coupler 472 from the second cylinder chamber 474b to a second manifold port 488b that connects with the third manifold conduit 462c. The second rod guide passage 182b extends through the first integral rod guide and pressure tube coupler 472 from the third cylinder chamber 474c to a third manifold port 488c that connects with the fourth manifold conduit 462d. The fourth cylinder chamber 474d and the second reservoir chamber 433b are arranged in fluid communication with one another and collectively form a second pressure chamber 433b, 474d within the first split load distribution unit 404a that is arranged in fluid communication with a fourth manifold port 488d that connects with the fifth manifold conduit 462e.

Many other modifications and variations of the present disclosure are possible in light of the above teachings and may be practiced otherwise than as specifically described while within the scope of the appended claims.

What is claimed is:

1. A suspension system, comprising:
a plurality of dampers including a front left damper with a first compression chamber and a first rebound chamber, a front right damper with a second compression chamber and a second rebound chamber, a back left damper with a third compression chamber and a third rebound chamber, and a back right damper with a fourth compression chamber and a fourth rebound chamber;
a plurality of hydraulic circuits including a first hydraulic circuit that extends between and fluidly connects said first compression chamber of said front left damper and said fourth rebound chamber of said back right damper, a second hydraulic circuit that extends between and fluidly connects said second compression chamber of said front right damper and said third rebound chamber of said back left damper, a third hydraulic circuit that extends between and fluidly connects said first rebound chamber of said front left damper and said fourth compression chamber of said back right damper, and a fourth hydraulic circuit that extends between and fluidly connects said second rebound chamber of said front right damper and said third compression chamber of said back left damper;
at least one load distribution unit arranged in fluid communication with at least two hydraulic circuits in said plurality of hydraulic circuits; and
said load distribution unit including a manifold block with a first cylinder bore, a first pair of pressure tubes that are at least partially received in said first cylinder bore on opposing sides of said manifold block to define a first pair of opposed cylinders, a first piston rod assembly with a first piston rod and a first pair of opposed pistons that are mounted on said first piston rod and are slidingly received within said first pair of opposed cylinders, and a first pair of reserve tubes that are at least partially received in said first cylinder bore on opposing sides of said manifold block and are arranged annularly about said first pair of pressure tubes to define a first pair of reservoir chambers between said first pair of pressure tubes and said first pair of reserve tubes.

2. The suspension system as set forth in claim 1, wherein said at least one load distribution unit includes a pair of split load distribution units that are positioned end-to-end between said front left and front right dampers or between said back left and back right dampers.

3. The suspension system as set forth in claim 1, wherein said first pair of reservoir chambers includes a first reservoir chamber and a second reservoir chamber and wherein said first pair of opposed pistons divides said first pair of opposed cylinders into a total of four cylinder chambers, including a first cylinder chamber, a second cylinder chamber, a third cylinder chamber, and a fourth cylinder chamber.

4. The suspension system as set forth in claim 3, wherein said first cylinder chamber and said first reservoir chamber are arranged in fluid communication with one another and collectively form a first pressure chamber within said load distribution unit, said fourth cylinder chamber and said second reservoir chamber are arranged in fluid communication with one another and collectively form a second pressure chamber within said load distribution unit, and said second and third cylinder chambers are separated from one another and form third and fourth pressure chambers within said load distribution unit.

5. The suspension system as set forth in claim 4, wherein said first piston rod assembly includes a first pair of opposed piston springs that are positioned in said second and third cylinder chambers and are arranged to bias said first pair of opposed pistons to a centered position.

6. The suspension system as set forth in claim 5, wherein said load distribution unit includes a second cylinder bore in said manifold block, a second pair of pressure tubes that are at least partially received in said second cylinder bore on opposing sides of said manifold block to define a second pair of opposed cylinders, a second piston rod assembly with a second piston rod and a second pair of opposed pistons that are mounted on said second piston rod and are slidingly received within said second pair of opposed cylinders, and a second pair of reserve tubes that are at least partially received in said second cylinder bore on opposing sides of said manifold block and are arranged annularly about said second pair of pressure tubes to define a second pair of reservoir chambers between said second pair of pressure tubes and said second pair of reserve tubes.

7. The suspension system as set forth in claim 6, wherein said first and second piston rods extend through said manifold block in a parallel and spaced apart arrangement.

8. The suspension system as set forth in claim 6, wherein said second pair of reservoir chambers includes a third reservoir chamber and a fourth reservoir chamber and wherein said second pair of opposed pistons divides said second pair of opposed cylinders into a total of four cylinder chambers, including a fifth cylinder chamber, a sixth cylinder chamber, a seventh cylinder chamber, and an eighth cylinder chamber.

9. The suspension system as set forth in claim 8, wherein said second piston rod assembly includes a second pair of opposed piston springs that are positioned in said sixth and seventh cylinder chambers and are arranged to bias said second pair of opposed pistons to a centered position.

10. The suspension system as set forth in claim 8, wherein said fifth cylinder chamber and said third reservoir chamber are arranged in fluid communication with one another and collectively form a fifth pressure chamber within said load distribution unit, said eighth cylinder chamber and said fourth reservoir chamber are arranged in fluid communication with one another and collectively form a sixth pressure chamber within said load distribution unit, said sixth cylinder chamber and said second cylinder chamber are arranged in fluid communication with one another and collectively form said third pressure chamber, and said seventh cylinder chamber and said third cylinder chamber are arranged in fluid communication with one another and collectively form said fourth pressure chamber.

11. The suspension system as set forth in claim 10, wherein said first pressure chamber of said load distribution unit is arranged in fluid communication with said first hydraulic circuit of said suspension system, said second pressure chamber of said load distribution unit is arranged in fluid communication with said fourth hydraulic circuit of said suspension system, said fifth pressure chamber of said load distribution unit is arranged in fluid communication with said second hydraulic circuit of said suspension system, and said sixth pressure chamber of said load distribution unit is arranged in fluid communication with said third hydraulic circuit of said suspension system.

12. A load distribution unit for regulating hydraulic pressure within a suspension system, comprising:

a manifold block with first and second cylinder bores that extend through said manifold block;

a first pair of pressure tubes that are at least partially received in said first cylinder bore on opposing sides of said manifold block to define a first pair of opposed cylinders;

a second pair of pressure tubes that are at least partially received in said second cylinder bore on opposing sides of said manifold block to define a second pair of opposed cylinders;

a first piston rod assembly with a first piston rod and a first pair of opposed pistons that are mounted on said first piston rod and are slidingly received within said first pair of opposed cylinders;

a second piston rod assembly with a second piston rod and a second pair of opposed pistons that are mounted on said second piston rod and are slidingly received within said second pair of opposed cylinders;

a first pair of reserve tubes that are at least partially received in said first cylinder bore on opposing sides of said manifold block and are arranged annularly about said first pair of pressure tubes to define a first pair of reservoir chambers between said first pair of pressure tubes and said first pair of reserve tubes; and a second pair of reserve tubes that are at least partially received in said second cylinder bore on opposing sides of said manifold block and are arranged annularly about said second pair of pressure tubes to define a second pair of reservoir chambers between said second pair of pressure tubes and said second pair of reserve tubes.

13. The load distribution unit as set forth in claim 12, wherein said first pair of opposed cylinders are closed off and sealed by a first pair of end caps, said second pair of opposed cylinders are closed off and sealed by a second pair of end caps, said first piston rod includes a first fixed segment that is secured to one end cap in said first pair of end caps and a first floating segment that is free to slide relative to and along said first fixed segment, and said second piston rod includes a second fixed segment that is secured to one end cap in said second pair of end caps and a second floating segment that is free to slide relative to and along said second fixed segment.

14. The load distribution unit as set forth in claim 12, wherein said first pair of reservoir chambers includes a first reservoir chamber and a second reservoir chamber and wherein said first pair of opposed pistons divides said first pair of opposed cylinders into a total of four cylinder chambers, including a first cylinder chamber, a second cylinder chamber, a third cylinder chamber, and a fourth cylinder chamber.

15. The load distribution unit as set forth in claim 14, wherein said second pair of reservoir chambers includes a third reservoir chamber and a fourth reservoir chamber and wherein said second pair of opposed pistons divides said second pair of opposed cylinders into a total of four cylinder chambers, including a fifth cylinder chamber, a sixth cylinder chamber, a seventh cylinder chamber, and an eighth cylinder chamber.

16. The load distribution unit as set forth in claim 15, wherein said first cylinder chamber and said first reservoir chamber are arranged in fluid communication with one another and collectively form a first pressure chamber within said load distribution unit, said fourth cylinder chamber and said second reservoir chamber are arranged in fluid communication with one another and collectively form a second pressure chamber within said load distribution unit, said second cylinder chamber and said sixth cylinder chamber are arranged in fluid communication with one another and collectively form a third pressure chamber within said load distribution unit, said third cylinder chamber and said seventh cylinder chamber are arranged in fluid communication with one another and collectively form said fourth pressure chamber within said load distribution unit, said fifth cylinder chamber and said third reservoir chamber are arranged in fluid communication with one another and collectively form a fifth pressure chamber within said load distribution unit, and said eighth cylinder chamber and said fourth reservoir chamber are arranged in fluid communication with one another and collectively form a sixth pressure chamber within said load distribution unit.

17. The load distribution unit as set forth in claim 15, wherein said first piston rod assembly includes a first pair of opposed piston springs that are positioned in said second and third cylinder chambers and wherein said second piston rod assembly includes a second pair of opposed piston springs that are positioned in said sixth and seventh cylinder chambers.

18. A suspension control system, comprising:
a first split load distribution unit configured to be arranged in fluid communication with one or more dampers; and
said first split load distribution unit including a first manifold block with a first cylinder bore, a first pair of pressure tubes that are at least partially received in said first cylinder bore on opposing sides of said first manifold block to define a first pair of opposed cylinders, a first piston rod assembly with a first piston rod and a first pair of opposed pistons that are mounted on said first piston rod and are slidingly received within said first pair of opposed cylinders, and a first pair of reserve tubes that are at least partially received in said first cylinder bore on opposing sides of said first manifold block and are arranged annularly about said first pair of pressure tubes to define a first pair of reservoir chambers between said first pair of pressure tubes and said first pair of reserve tubes.

19. The suspension control system as set forth in claim 18, further comprising:
a second split load distribution unit including a second manifold block with a second cylinder bore, a second pair of pressure tubes that are at least partially received in said second cylinder bore on opposing sides of said second manifold block to define a second pair of opposed cylinders, a second piston rod assembly with a second piston rod and a second pair of opposed pistons that are mounted on said second piston rod and are slidingly received within said second pair of opposed cylinders, and a second pair of reserve tubes that are at least partially received in said second cylinder bore on opposing sides of said second manifold block and are arranged annularly about said second pair of pressure tubes to define a second pair of reservoir chambers between said second pair of pressure tubes and said second pair of reserve tubes.

20. The suspension control system as set forth in claim 19, wherein said first and second split load distribution units are positioned in an end-to-end arrangement where said first piston rod assembly and said second piston rod assembly are aligned with one another along a common axis.

* * * * *